US012783324B2

(12) United States Patent
Gross et al.

(10) Patent No.: US 12,783,324 B2
(45) Date of Patent: *Nov. 3, 2026

(54) METHOD AND SYSTEM FOR DISTRIBUTED WORKLOAD PROCESSING

(71) Applicant: SAILION INC., New York, NY (US)

(72) Inventors: Tyler Gross, New York, NY (US); Ronald A. Felice, Summerville, SC (US)

(73) Assignee: SAILION INC., New York, NY (US)

( * ) Notice: Subject to any disclaimer, the term of this patent is extended or adjusted under 35 U.S.C. 154(b) by 418 days.

This patent is subject to a terminal disclaimer.

(21) Appl. No.: 18/568,050

(22) PCT Filed: Jun. 9, 2022

(86) PCT No.: PCT/US2022/072833

§ 371 (c)(1),
(2) Date: Dec. 7, 2023

(87) PCT Pub. No.: WO2022/261652

PCT Pub. Date: Dec. 15, 2022

(65) Prior Publication Data

US 2024/0264881 A1 Aug. 8, 2024

Related U.S. Application Data

(60) Provisional application No. 63/209,002, filed on Jun. 10, 2021.

(51) Int. Cl.
*G06F 9/50* (2006.01)
*G06F 11/34* (2006.01)

(52) U.S. Cl.
CPC .......... *G06F 9/5083* (2013.01); *G06F 9/5038* (2013.01); *G06F 9/5044* (2013.01); *G06F 11/3447* (2013.01)

(58) Field of Classification Search
CPC .... G06F 9/5083; G06F 9/5038; G06F 9/5044; G06F 11/3447; G06F 9/5016; G06F 9/5066; G06F 9/5072; G06F 11/3433
See application file for complete search history.

(56) References Cited

U.S. PATENT DOCUMENTS 7,738,404 B2 6/2010 Deb et al.
8,104,038 B1 1/2012 Graupner
(Continued)

FOREIGN PATENT DOCUMENTS

EP 2 977 898 B1 8/2018
EP 3865056 B1 * 11/2025 ............. G06F 3/015

OTHER PUBLICATIONS

European Patent Office, Extended European Search Report issued for corresponding patent Application No. 22821253.6, Mar. 17, 2025.

(Continued)

*Primary Examiner* — Kevin L Young
*Assistant Examiner* — Phuong N Hoang
(74) *Attorney, Agent, or Firm* — Gottlieb, Rackman & Reisman, PC

(57) ABSTRACT

A method and system for distributing a compute model and data to process to heterogeneous and distributed compute devices. The compute model and a portion of the data is processed on a benchmark system and the timing used to make a job execution speed estimate for each compute device. Compute devices are selected and assigned data chunks based on the estimate so distributed processing is completed within a predefined time period. The compute model and data chunks can be sent to the respective compute devices using separate processes, such as a payload manager configured to transfer compute jobs to remote devices and a messaging engine configured to transfer data messages, and where the payload manager and messaging engine commu- (Continued)

nicate with corresponding software engines on the compute devices.

22 Claims, 16 Drawing Sheets

(56) References Cited

U.S. PATENT DOCUMENTS

| | | | |
|---|---|---|---|
| 8,365,183 | B2 | 1/2013 | Esfahany et al. |
| 9,015,324 | B2 | 4/2015 | Jackson |
| 9,058,216 | B2 | 6/2015 | Frean et al. |
| 10,257,136 | B2 | 4/2019 | Wang et al. |
| 10,510,007 | B2 | 12/2019 | Singhal et al. |
| 10,686,743 | B1 | 6/2020 | Coen et al. |
| 10,715,394 | B2 | 7/2020 | Keidar et al. |
| 10,725,206 | B2 | 7/2020 | Eickelman et al. |
| 10,762,066 | B2 | 9/2020 | Hanatani et al. |
| 10,868,895 | B2 | 12/2020 | Wouhaybi et al. |
| 10,965,558 | B2 | 3/2021 | Jayakumar et al. |
| 10,976,948 | B1 | 4/2021 | Lee et al. |
| 10,977,085 | B2 | 4/2021 | Bivens et al. |
| 11,005,833 | B2 | 5/2021 | Caldwell |
| 2010/0223212 | A1* | 9/2010 | Manolescu .............. G09B 7/00 706/46 |
| 2012/0197625 | A1* | 8/2012 | Wang ...................... G06F 9/485 703/22 |
| 2012/0222042 | A1* | 8/2012 | Chess ................... G06F 9/5072 718/105 |
| 2015/0067019 | A1 | 3/2015 | Balko |
| 2015/0178419 | A1 | 6/2015 | Li et al. |
| 2017/0099352 | A1 | 4/2017 | Baughman et al. |
| 2017/0169336 | A1* | 6/2017 | Singhal ............. G06F 16/90335 |
| 2017/0293980 | A1 | 10/2017 | Phillips et al. |
| 2018/0276049 | A1* | 9/2018 | Kattepur ............. G06F 11/3428 |
| 2019/0220703 | A1* | 7/2019 | Prakash ................... G06N 3/09 |
| 2021/0081787 | A1 | 3/2021 | Qi et al. |
| 2021/0149680 | A1 | 5/2021 | Hughes et al. |

OTHER PUBLICATIONS

International Search Report and Written Opinion for PCT/US22/72833; US Patent and Trademark Office as the PCT International Searching Authority, Aug. 19, 2022.

Collection of Open Horizon documentation, retrieved from https://open-horizon.github.ioldocs/ between Sep. 3, 2022 and Sep. 7, 2022.

* cited by examiner

METHOD AND SYSTEM FOR DISTRIBUTED WORKLOAD PROCESSING

CROSS-REFERENCE TO RELATED APPLICATIONS

The present application is a U.S. National Phase of PCT Application No. PCT/US22/728933, filed Jun. 9, 2022, and which application claims priority to U.S. Provisional Patent Application Ser. No. 63/209,002 filed on Jun. 10, 2021, the entire contents of which is expressly incorporated by reference. This application is also related to U.S. application Ser. No. 17/806,203, filed on Jun. 9, 2022, now U.S. Pat. No. 11,609,799, and which also claims priority to U.S. Provisional Patent Application Ser. No. 63/209,002 filed on Jun. 10, 2021.

FIELD

The present disclosure relates generally to computer systems and methods for compute job and workload distribution and disaggregation to remote and mobile devices and the collection of the job processing results from those devices.

BACKGROUND

There are many situations where an individual or company needs to execute a resource intensive computation to analyze large data sets but does not have the computing resources directly available and so they rely on third party on-demand services, such as various commercial cloud computing platforms built on one or more datacenters within which exists a closed network of servers. Certain types of these computations do not operate on the entire data set as a whole, but instead can process the data in discrete chunks. Such workloads include, but are not limited to, deep learning classification and prediction models, time series, multivariate and stochastic models, etc. These types of computations can be can be divided into smaller jobs that are chunked out evenly across devices. Accomplishing this can require a forced homogeneity among compute node devices and/or result in underutilization of computing assets and this can result in significant workload and device utilization inefficiency. Establishing and maintaining such a cloud-computing data center can be expensive, requiring significant investment in computing hardware and having large power requirements.

It would be advantageous to provide a system and method that can distribute a workload for execution across a heterogeneous distributed computing environment, and further advantageous if such a system and method were able to reliably operate using as compute resources portable and mobile devices, such as smart phones and tablets, which can have limited and inconsistent network access to receive job data and return job results, and where the operation of any given device can be constrained by available battery life as well the need of a user of a given mobile device to use that device for other purposes.

SUMMARY

These and other issues are addressed by a method and system in which a central management platform, which can be a dedicated server or a cloud-based system, operates to distribute data processing jobs to a plurality of network connected compute devices that can be remotely accessed, and comprise heterogeneous devices that are unrelated to each other. Each compute device is of a device type, such as a particular type of smart phone or IoT device, has a respective network address and is also characterized by various available devices resources, such as processing and storage resources.

When a job payload comprising an executable compute model and associated data is submitted to the management platform, the received compute model is applied to a benchmarking system using a portion of the received data in order to determine a benchmark job computation speed for the received payload. The benchmarking system can be a single platform with known characteristics or a plurality of different types of devices which reflect the types of compute devices that may be used by the system.

The benchmark computation speed is used to make an estimate of job execution speed for the plurality of compute devices. The estimated execution speed can then be used when selecting from the plurality of compute devices a cluster of devices to use for executing the compute model. Where multiple different types of benchmark devices are used, the job execution speed estimate for a given compute device can be based on the benchmark data for the benchmark device that is considered closest in nature to the respective compute device, as indicated for example by the value of a similarity vector of device characteristics.

Device selections and allocation of one or more data chunks can be made so that the overall amount of time for a given compute device to complete processing of all allocated data chunks is less than a predefined amount of time. For example, if the whole compute job must be computed within a time t, each compute device can be selected and assigned data chunks that, based on the estimated job execution speed, will be completed within time t. A buffer, such as 10%, can be factored in to account for potential delay.

Compute device selection and data chunk assignment can be done to maximize desired operating conditions. In an embodiment, selection is made to avoid using a compute device that is faster than necessary to complete the assigned work by the deadline. If sufficient compute devices are not available to complete the total job within performance constraints, one or more virtual compute devices can be created or activated using a commercial cloud computing service.

After the data chunks are assigned to the various compute devices, the compute model and data allocated are sent to the respective compute devices in the cluster. For any given compute device, all allocated data chunks can be sent in a batch for processing, or alternatively the compute device can be given none, one, or only some data chunks with the remainder as data chunk identifiers only. New data chunks can be fetched from the management platform on demand as others are completed. The processed data results generated by the compute devices are subsequently returned to the management platform and can be made available to the requestor.

In an embodiment, the compute model and data chunks can be sent using separate communication transfer methods. For example, a first transfer mechanism for sending the compute model payload can be in the form of edge computing software on the management platform that is configured to deliver compute payloads to a corresponding payload processing engine on a compute device which operates to extract and run the payload on designated data. The data chunks can be sent using a second transfer mechanism, such as a streamlined message broker service configured for general event driven and other messaging between applications and without the added overhead of a payload processing system. Corresponding messaging software operating on the compute device operates to make data chunks received on a compute device available to the payload processing engine. The results of the computations can also be returned using the messaging service.

After allocating and sending compute model and data to a compute device, its operation can be monitored to detect potential error conditions. In an embodiment, a completion deadline for a given compute device is determined based on the estimated job execution speed for that device. If the deadline has passed without receiving the computation results, the assigned data chunks can be reallocated by the management platform to a different compute device, which device can be selected from the plurality of compute devices and can be a device which is already in the cluster or a compute device which is not in the cluster, and so will need to be sent the compute model as well as the reassigned data chunks.

Operation of the compute devices can also be monitored. Software in the compute devices can operate to detect health or other operating issues and send health alert messages to the management platform as appropriate. The management platform can also periodically poll the compute devices to request a response message indicating health status of the respective compute device. If health alert message is received or a poll response is received that indicates a health condition or alert of a type where the compute device cannot or may not be able to complete processing of the assigned data chunks within the deadline, one or more of the assigned chunks can be reassigned to a different compute device. Where a compute device is battery operated, a particular health alert can indicate a low battery condition in which insufficient power is available for that compute device to complete the assigned work.

The compute devices themselves can also monitor their own health and when a health condition or alert is detected, such as low battery, lack of memory or insufficient CPU resources, in addition to sending an alert to the central management platform, the compute device can act to pre-emptively offload some or all of its unprocessed data chunks to a different compute device for processing there. This feature can be particularly useful in an operating environment where a network link to the management platform is not continuously available, and where the health issue may occur well prior to the deadline when the management platform is expecting to receive results.

The target compute device selected to transfer a workload or job results can be one that is accessible via a local connection such as via WiFi, Bluetooth, or NFC even if an Internet connection to the management platform is not available. The management platform can be informed by either or both of the compute devices about the offloading of unprocessed or processed workloads as permitted by available network connections. In such a case the management platform can then determine whether to allow the reassignment to stand or to reassign some or all of the data chunks to a third compute device, for example if deemed necessary to meet job completion deadlines. Similarly, where data results cannot be returned because of network connectivity issues, a compute device can operate to transfer the results to a different compute device that may have a network connection to the management platform and can return the data.

BRIEF DESCRIPTION OF THE FIGURES

Further features and advantages of the invention, as well as the structure and operation of various implementations of the invention, are disclosed in detail below with references to the accompanying drawings in which.

DETAILED DESCRIPTION

Figure 1:
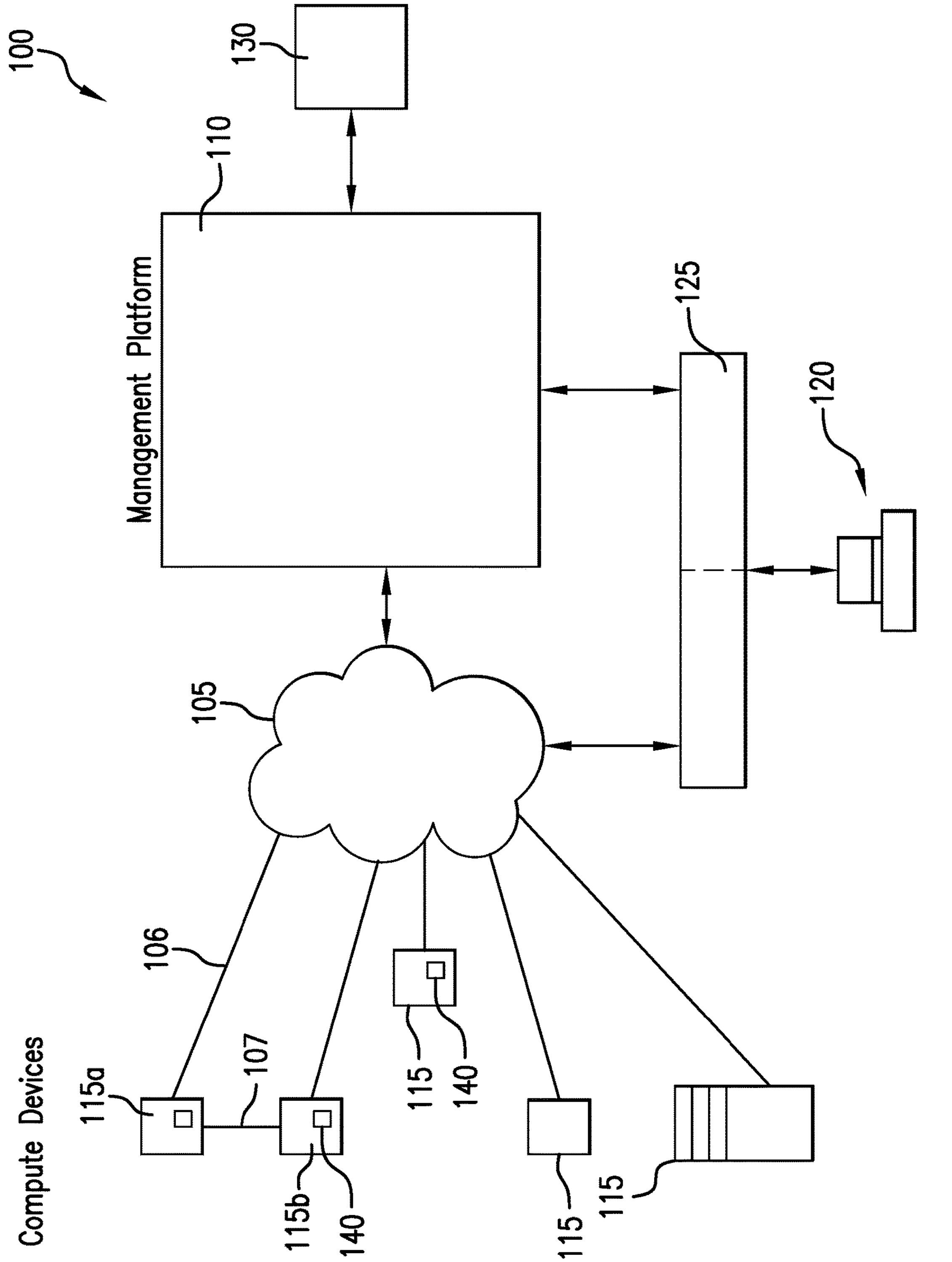
FIG. 1 is a high level diagram of a system for use in distributed workload processing.

FIG. 1 is a high level diagram of a system 100 for use in distributed workload processing. The system 100 comprises a compute management platform 110 which is connected to a network 105 and through it communicates with a plurality of compute devices 115, such as devices 115*a* and 115*b*. Compute devices 115 are used to execute compute jobs. A compute job can comprise an executable compute model and data to be processed by the model. As described further herein, the management platform 110 selects one or more compute devices 115 for use in performing compute job. A disaggregation process is used to divide the workload data into data chunks comprised of one or more individual records, where each record can be processed by the compute model. Data chunks can be sized and assigned to compute devices 115 based on the capabilities of the devices and workload data chunks can be of different sizes depending on the resources and capability of the various compute devices to be used. Devices can be assigned one or more data chunks to process. The management platform 100 distributes the model and chunks of the job data to the selected compute devices 115. Application software 140 running on the compute devices 115 operates to receive a model, apply it to received chunks of data, and return processed data results to the management platform 110. The execution results from each compute device 115 are obtained and aggregated within the management platform 110 and the final results returned to the compute requester.

Management platform 110 can be accessed by a customer or system administrator through a remote computer device 120. An access interface 125 can be used for submission of compute jobs and data and retrieval of the results, control of system settings, monitoring of the operation of management platform 110 or various compute devices 115, or for other purposes. Interface 125 can provide a direct connection to management platform 110, such as through a suitable API, or through the network 105, such as by in the form of an internet web server interface.

Network 105 can be a distributed network such as the Internet, a LAN, WAN, or other open or closed network. The management platform 110 and compute devices 115 include conventional hardware and software, such as a hardwired Ethernet, or a wireless Wi-Fi, Bluetooth, cellular, or other data link(s) through which suitable network connections can be established. Intermediate network devices (not shown), such as access points and routers, cell towers, and intermediate networks that connect to network 105 can be used to establish a connection to Network 105. While only a single network 105 is shown in FIG. 1, as discussed further herein, in various embodiments more than one network can be used for communication between devices.

Management Platform 110 can be implemented in a computer server platform comprising one or more computer systems with processing power, network connectivity, and data storage capability suitable for maintaining registration of compute devices, receiving job models and data, distributing the models and data to the various compute devices, and receiving and aggregating the results to be returned to the user. Suitable hardware platforms will be known to those of ordinary skill in the art and particular attributes, such as the operating system and method of access can vary according to implementation. In a particular embodiment, the management platform 110 is implemented in a cloud computing system using one or more virtualization technologies, such as a virtual or cloud computer with cloud storage. This allows for ease of implementation and easily scalability of the capabilities of the management platform 110. A hybrid approach can also be taken with certain functionality implemented on a discrete computer while other functions are offloaded to a cloud computing platform.

A test platform 130 can also be connected to the management platform 110. Test platform 130 can be used for model benchmark operations as discussed further herein.

Figure 2:
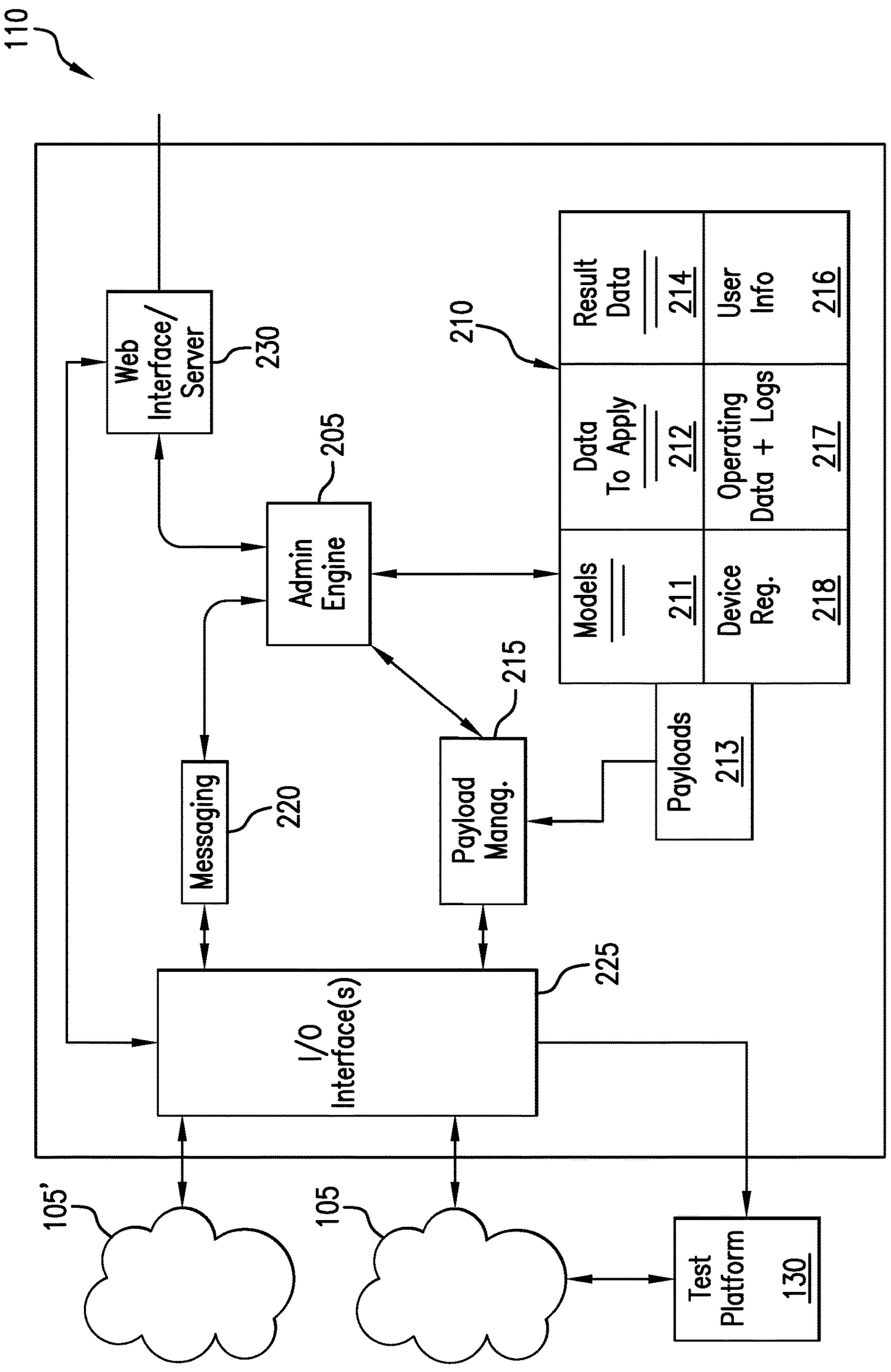
FIG. 2 is a high-level diagram of a software architecture for a management platform.

FIG. 2 is a high-level diagram of a software architecture for management platform 110. An Administration (Admin) Engine 205 provides the main functionality of the management platform 110 as described herein. It can be implemented using software which itself can be divided into various applications and processes. Admin Engine 205 is in communication with memory 210 which can be a combination of various discrete storage and include a mixture of short term (RAM) and longer term storage, as local and network drives and cloud storage. In addition to storing operating software used by the Admin Engine 205, memory 210 can also be used to store one or more models 211 which are to be executed, the data 212 which is to be processed by the model, payloads 213 which are construed to deliver the model with or without chunks of data to process with the model, and result data 214 generated by running the model on the data chunks and returned to the management platform 110. Memory 210 can also be used to store device registration data 218 for the compute devices 115 that can be called on for use in the system 100, user information 216 for users of the system 100 including customers who may submit jobs and data for processing, persons associated with registered compute devices 115, and administrators of the system 100. Additional information 217 such as operation data and system logs can also be stored.

A payload manager engine 215 communicates with software 140 in the compute devices 115 to send payloads to them, which payloads include a compute model and can also include one or more data chunks to process using the model. A separate messaging engine 220 can be used to also communicate with the software 140 in the compute devices 115. As addressed further herein, in an embodiment, the models are sent to compute devices using the payload manager while the messaging engine 220 is used to send the data chunks that are to be processed by the models and to receive the results. Payload manager 215 and messaging engine 220 can connect to the network 105 using the same lower level network interface 225. Connections to other networks, such as a network 105' can also be provided. Test platform 130 can be accessed through a network, such as network 105, or through a direct connection. General access to the management platform 110 for users and administrators can be through a web browser that connects to a web page interface 230.

In a system 100 there will typically be a plurality of separate compute devices 115, each of which has computing capacity that can be available to be called on by the management platform 110 for use in execution of compute jobs at least a portion of the time. The system 100 can operate with a set of compute devices that are homogenous or heterogeneous so that a wide variety of different types of compute devices can be used simultaneously.

A particular compute device 115 can be a portable and mobile device, such as battery operated smart phone, tablet or laptop computer, an IoT device, or other network connected computing device. A compute device 115 could also be a fixed location device with an external power supply, computer, such as a desktop PC or computer server operating in a stand-alone environment or available as part of a data center. Other types of compute devices 115 may also be used.

Figure 3:
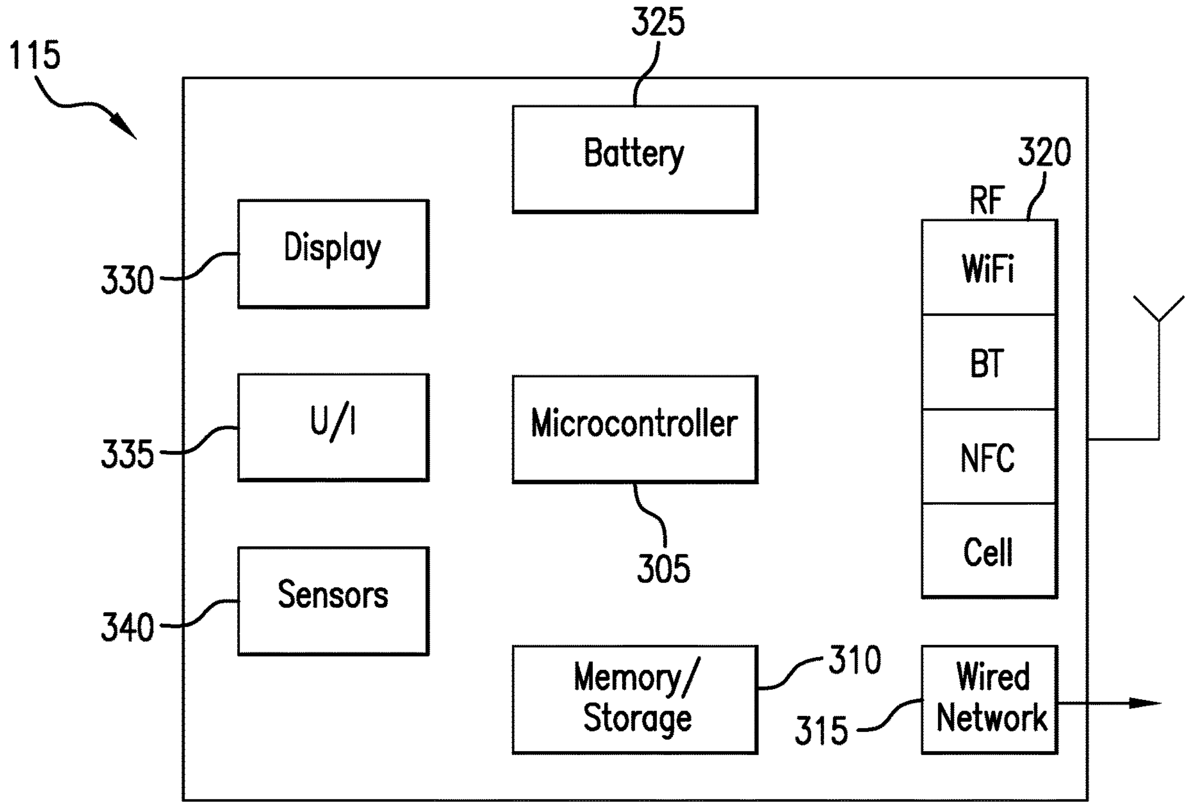
FIG. 3 is a high level hardware block diagram of a representative compute device.

A high level hardware block diagram of a representative compute device 115 is shown in FIG. 3. A typical compute device 115 includes a microcontroller 305 connected to memory 310, which can include both short and long term storage, such as RAM, ROM, a solid-state drive, etc. Memory 310 stores software which is executed by the microcontroller 305. The software can include program storage for the operating system, application software 140 for use in system 100, and software for other applications, and data storage used by the software. One or more network interfaces are also provided for connection to network 105 and other networks. Network connections that may be available include a wired network connection 315, such as an Ethernet connection, and wireless data connections 320 of one or more types, including Wi-Fi, Bluetooth, Near Field Communication (NFC), and cellular data. Network connections 315, 320 can be used to communicate over network 105 with the Management Platform 110. Network connections can also be used to identify and communicate with other compute devices 115. The compute device can be powered externally or be powered by a battery 325. Depending on the type of compute device, a visual display 330 and user input device 335, such as a keyboard or touch screen can be present. Various sensors 340 can be provided to monitor device conditions such as microcontroller temperature and battery level.

It is anticipated that compute devices 115 will be used for other purposes and that the device may be mobile. Accordingly, for any given compute device 115, compute resources may be available on a continuous or intermittent basis and when resources are available, the resources may reflect substantially the full capacity or only a partial capacity of the compute device 115. Available capacity of a given compute device 115 may vary over time.

Figure 4:
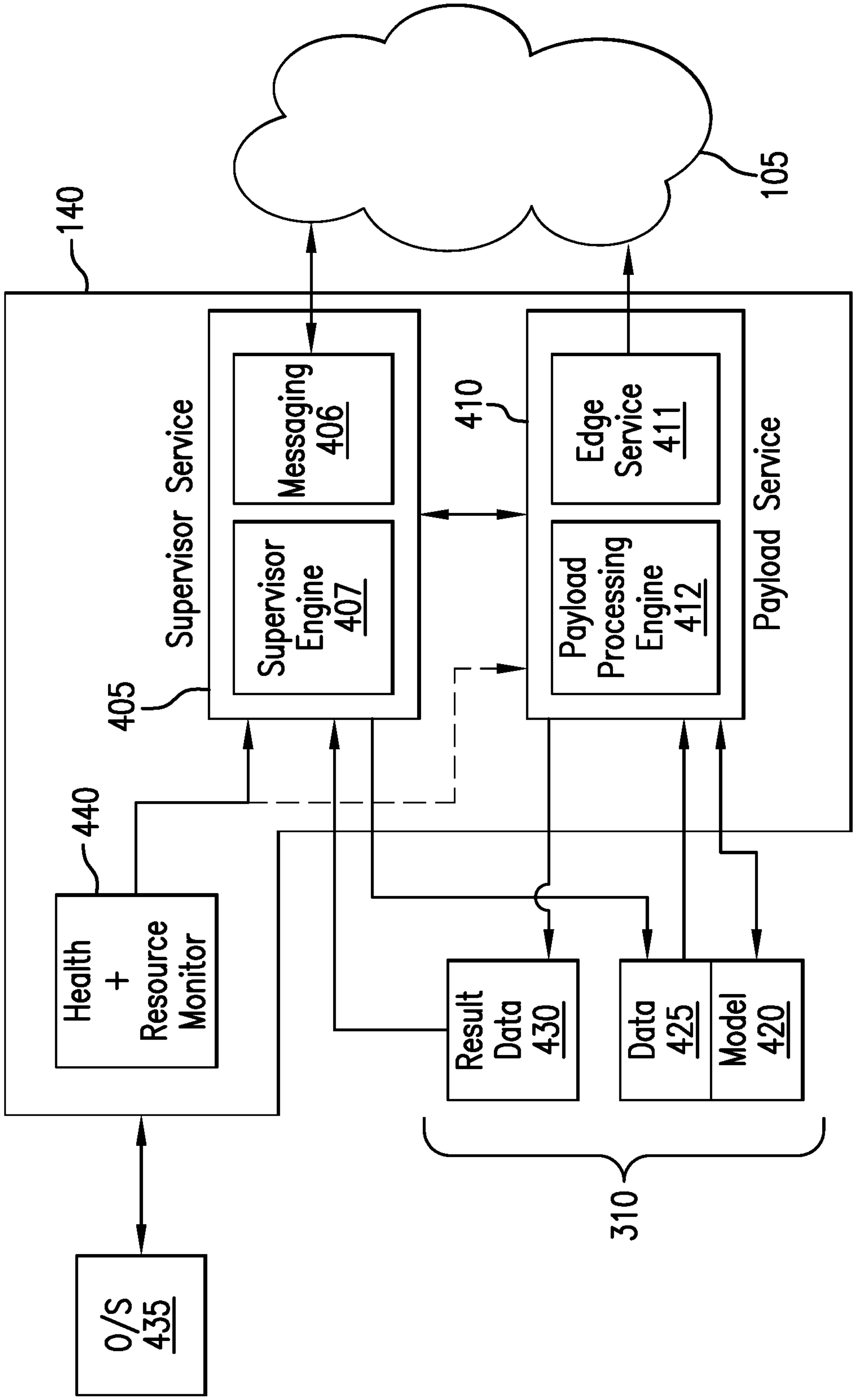
FIG. 4 is a high-level diagram of a software architecture of application software in a representative compute device.

FIG. 4 is a high-level diagram of a software architecture of application software 140. A payload service 410 operates to receive payloads from the management platform 110, such as sent from the payload manager 215, run a compute job on selected sets of data, and stores the results. Payload service 410 can comprise an edge service 411 that manages communication with the payload manager 215 and an payload processing engine 412 that has functionality to run received models and data. Received models can be stored in model storage 420 within memory 310 of the compute device 115. Sets of data (the data chunks) to be applied to the model can be stored in a data storage area 425 in memory 310. The computed data from the model applied to received data chunks can be stored in a result data area 430 of memory 310.

As discussed further below, in an embodiment, the data chunks to be processed by the model can be provided to supervisor service 405 from the messaging engine 220 in the management platform 110. Supervisor service 405 can comprise a messaging engine 406 for communication with messaging engine 220 in the management platform 110 and a supervisor engine 407 that contains operative functionality to store received data chunks into the data storage area 425 in a manner in which it is known and accessible to the payload service 410 and wherein payload service 410 can apply the model to that data. Likewise, result data is accessed by the supervisor service 405 which can be returned to the management platform 110 by the supervisor engine 407 via messaging engine 406. Supervisor engine 407 performs various other functions as addressed further herein.

Application software 140 operates on compute device 115 in communication with the device operating system through which it can access various system functions, inputs and outputs, etc., including the software, firmware, for data communication and other functions. Also shown in FIG. 4 is health and resource monitors 440 which can signal to the supervisor service 405 and the payload service 410, as appropriate, system conditions including CPU temperature, battery level, available memory, processor, and the status of other system resources. While health and resource monitor 440 is shown as a single module, various separate modules can be used. The monitoring can be part of the application software 140 or implemented within the hardware, firmware, and/or the O/S 435 or other software on the compute device wherein the health and resource monitor 440 issues system queries to the O/S to obtain system status data and can monitor system interrupts that can signal significant issues such as a low battery alert, excess CPU temperature, and out of memory errors.

Details about resources and capacity available from a given compute device 115 can be collected during an initial registration of the computer device 115 with the management platform 110. In an initial registration, information about the compute device 115 is collected and stored in the memory 210, such as in a device registration database 218. In addition, during registration end-user application 140 can be installed on the compute device so that it can interact with system 100 as disclosed herein to receive and execute assigned compute jobs and return the results. The overall operation of the application 140 can be the same on different types of compute devices although specific implementation details can differ. Application software 140 can be installed in stages with an initial installation used to validate the node device meets minimum requirements operation hardware and software platform requirements.

Each compute device 115 has an associated unique IP or other network address that can be used to communicate with it. A separate device ID can also be assigned during registration. Depending on the device capabilities, more than one communication address may be available and these separate addresses can be stored. The management platform 110 can select among available addresses depending on network availability and type of communication. For example, most communications are expected to be carried through the network 105, which may be the Internet. However, some messages may be communicated using a separate protocol, such as SMS messaging over a cellular network when the primary network connection is unavailable and communication is still desired.

Because of the widely distributed and diverse nature of these compute resources, over networks of disparate capability and persistence, various computing metadata attributes for each device can also be collected during registration. This metadata specifies individual capabilities of the registered compute devices. Device attributes that reflect the capacity of the device can include one or more of CPU type and speed, RAM and software storage space, network latency, operating system, whether the system is or may be battery powered, and type of network connection(s) available. Other metadata can include restrictions on days/times the registered device is or is not available for use by system 100. Some or all of such metadata can be used by the management platform 110 to identify available compute devices 115, to which a given compute job will be sent for execution, and to determine how the data will be chunked and distributed to the selected devices.

The available capabilities of a compute device may change over time. For example, a given device may be able to provide 100% of its computing capability and memory outside of normal business hours but only 25% on weekdays between 9 am and 5 pm. Details about anticipated availability can be collected during a registration process. Availability patterns can also be monitored over time to develop device profiles. The available capabilities for a given device can also shift dynamically. A device may have 100% capacity at time T while idling but only partial capacity that can be provided to the present system when the device is in active use for other reasons. Accordingly, the capabilities for a given device initially set within the system registration or learned over time can be confirmed by the management platform 110 prior to assigning any compute job to the device. A compute device 115 can also periodically send a message to the management platform 110 reporting its available resources or the management platform 110 can periodically query compute devices to retrieve this information.

During general operation of system 100, the overall status of registered compute devices can be monitored and internal records of a current compute device status can be maintained by the management system 110. When a compute device is operating normally (which can be indicated, e.g., by messages sent from the compute device periodically or in response to system queries, the device state can be set to active. If the node is not operating at full capacity, for example, where only some of the expected resources are available but sufficient remain for the compute node to be used at least in some circumstances, the compute node status can be set to a degraded level. This degraded level can then be used when ranking and selecting nodes to receive workload packages. If the device is not operating or available resources are less than minimum requirements, the node device state can be set to suspended.

In some cases there is a need to remove a compute device from available inventory, either temporarily or on a permanent basis. If the compute device is currently running a job, the compute device can be instructed to send a message to the management platform 110 system when the job is completed or the compute device can be periodically queried. When a notification that the device is free is received, the device can then be removed from inventory.

Figure 5A:
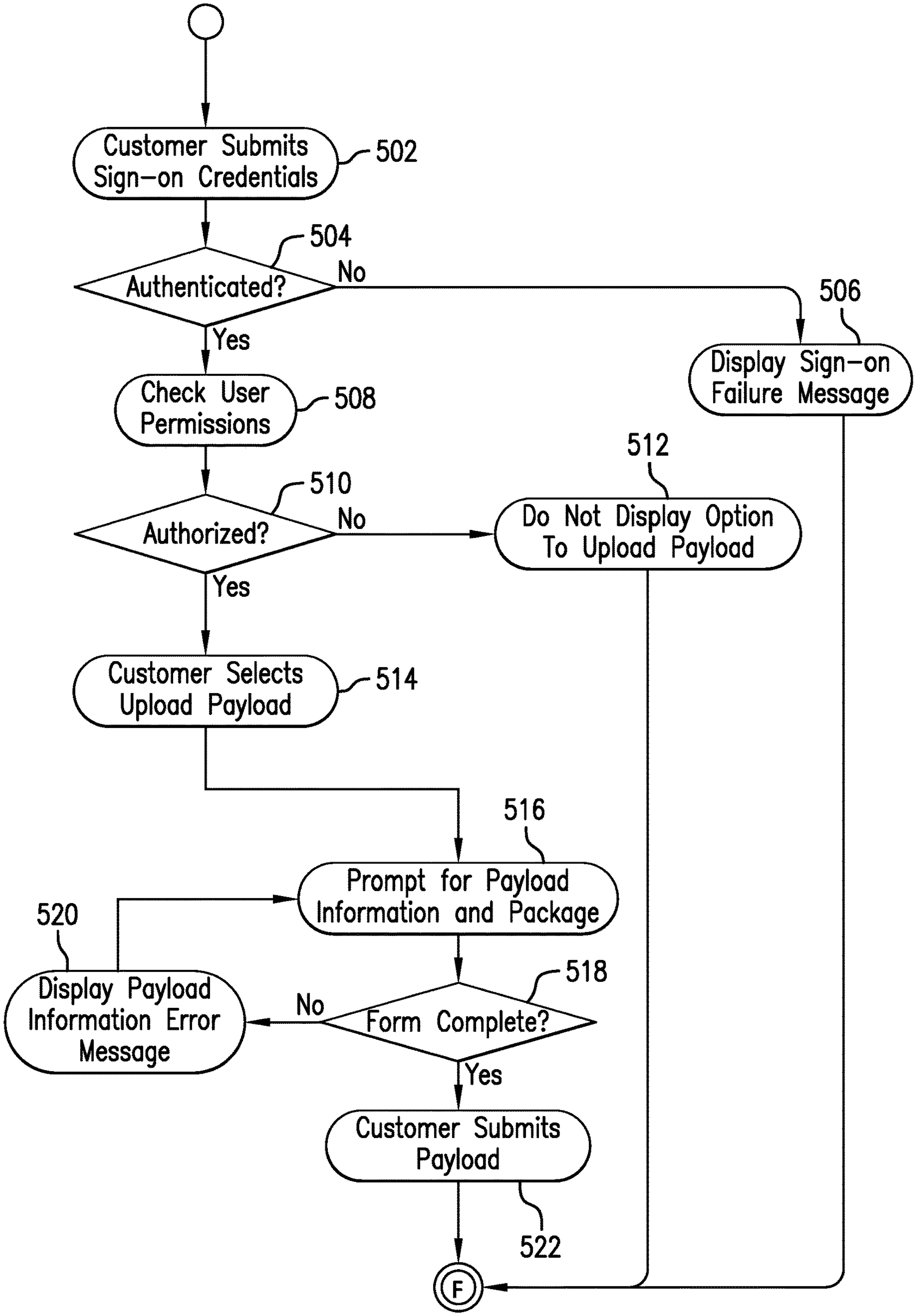
FIGS. 5A and 5B show a high level flowchart for submission by a user of a job payload including a model and data and verification of the same.
Figure 5B:
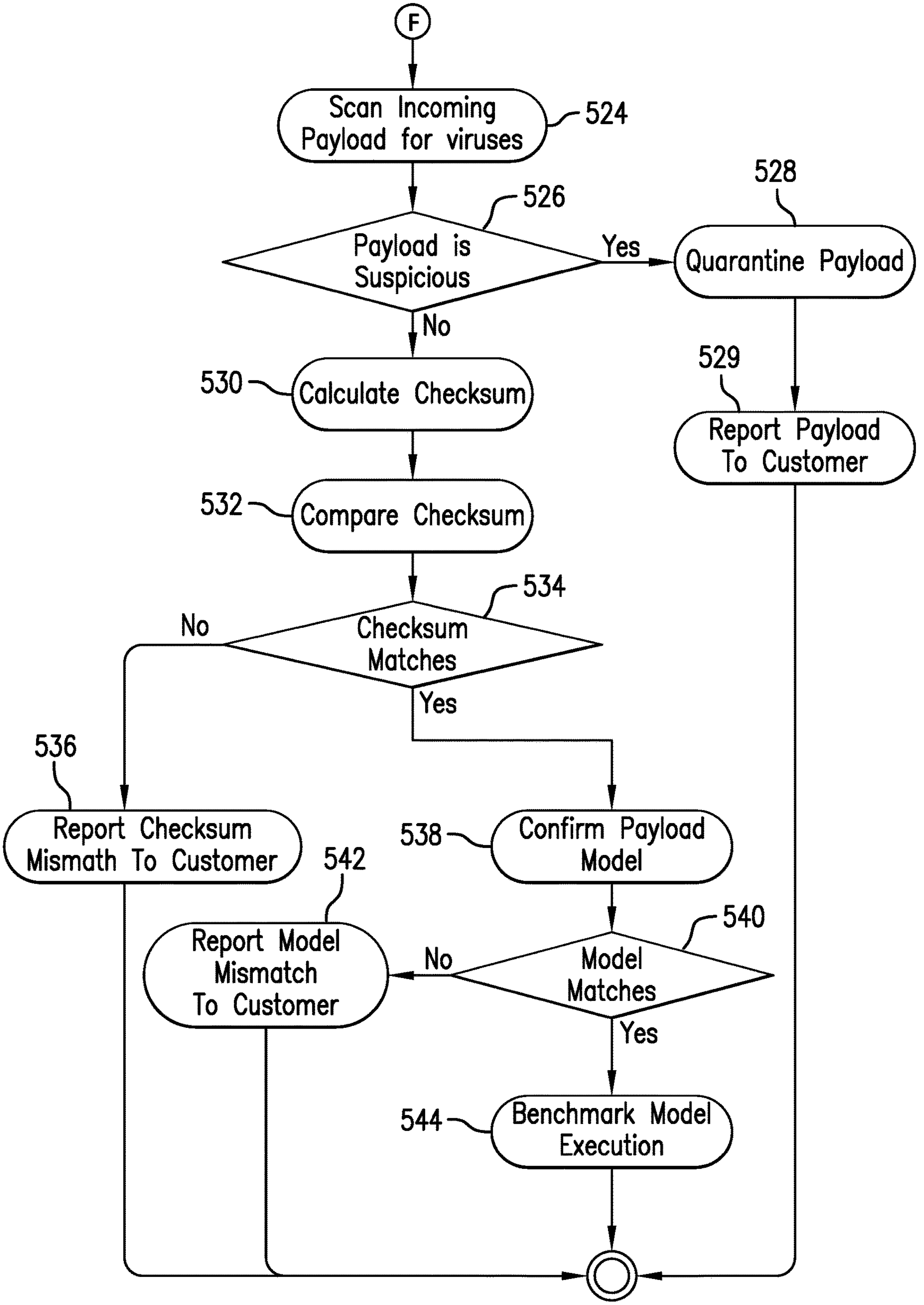

FIGS. 5A and 5B show a high level flowchart for submission by a user of a job payload including a model and data and verification of the same. As initial steps, the user connects to the management platform 110, such as through web interface 230, and signs in. An initial check can be made to authenticate the user and check that they are authorized to submit jobs. (Steps 502-512). Provided the user has appropriate authority, in response to selection of a payload upload option, the user can be prompted to provide information about the payload, such as the general type of processing job, amount of data, target completion time/date, etc. Checks can be made to confirm input data is correct and does not exceed user authority. For example, a maximum job size may be in place. (Steps 514-518). Provided there are no blocking issues, the customer can upload the payload using conventional mechanisms, such as by tagging a job model file and a one or more job data files. (Step 522)

After a user payload is uploaded, initial security checks can be performed. A virus scan be performed and if the payload appears suspicious it can be quarantined and the issue reported to the customer. (Steps 524-529). A checksum or similar verification can also be performed on the model and data (individually or in combination) which are compared to check data provided by the user or embedded in the payload as uploaded to detect data errors. If errors are detected the payload can be rejected and the error reported to the user. (Steps 530-536).

Different types of model analysis have different computational complexity. To assist in selecting a set of compute devices that can execute the job by the targeted time, the job submitter can also be required to identify the type of analysis the workload model is executing, for example by selecting from a predefined set of analysis types. The type of analysis can be used to estimate the speed at which a predefined amount of typical data will be processed by a given processor, and thereby the amount of time it will take a given compute device 115 to process a data chunk.

As part of the upload process, a confirmation of the payload model type can be performed to confirm that the model type or algorithm coded in the payload matches with the model or algorithm type specified by the customer (step 538). Pattern matching can be used on the code to identify common types of routines used in different analysis types. Other metadata can also be considered. For example a simple classification model built with TensorFlow Lite will have different performance characteristics than an object detection model built with TensorFlow. If there is a model mismatch it can be reported to the customer. (Steps 540-542). An AI based pattern matching model type detection can be used with the AI model trained over time as the system 100 operates.

In addition or as an alternative to obtaining job type information from the submitter, the management platform 110 can perform a benchmarking operation to determine for a given job a measurement of compute speed. (Step 544). Benchmarking also advantageously provides validation that a provided compute model is functional and can operate on the provided data. When multiple different devices are used for benchmarking, this may identify platforms which are not compatible with the compute model and so should not be selected for use in that job even of otherwise available.

Figure 6:
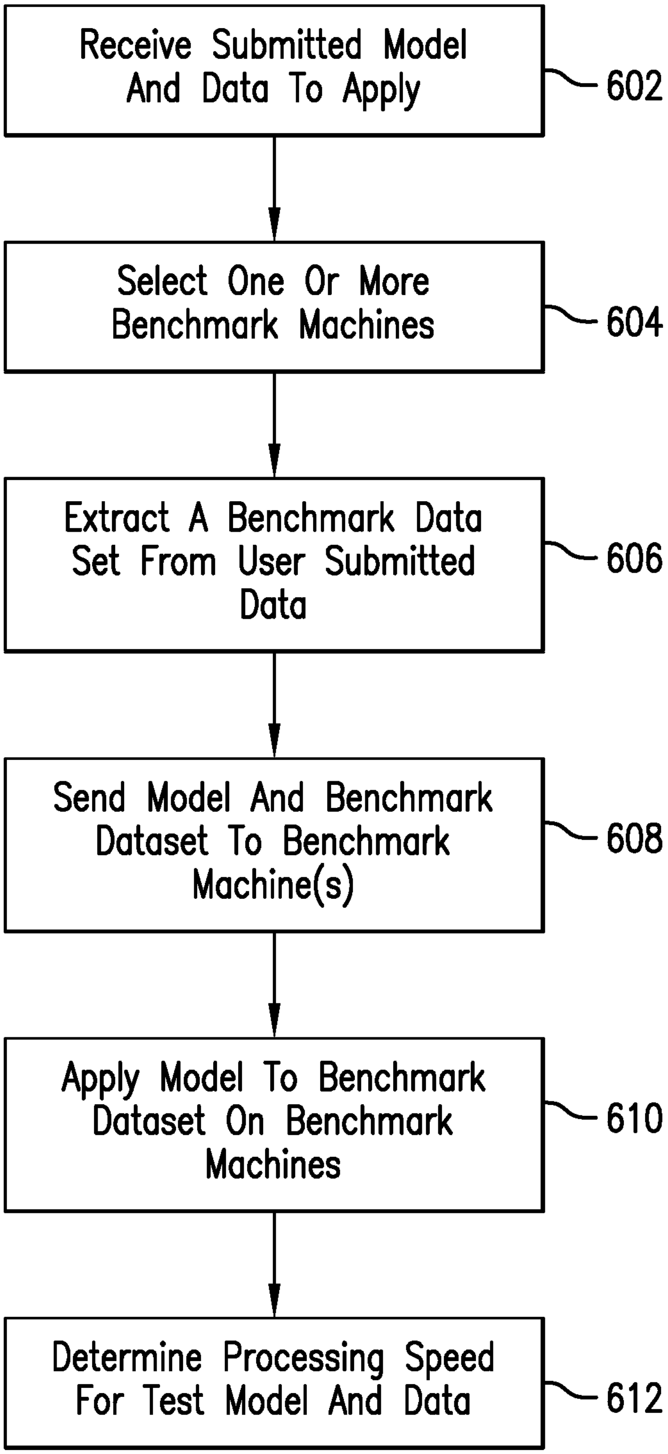
FIG. 6 is a high level flowchart of compute job benchmarking.

In an embodiment, the submitted compute model using some of the actual data to be processed in the job is run on one or more computers in a test platform 130 and that have known computing characteristics to do the benchmarking. With reference to FIG. 6, after receiving a submitted model and the data to apply to it (step 602), one or more benchmarking machines is selected. (Step 604), and representative data to apply to the submitted model is extracted from the submitted data set. (Step 606). A benchmark test using the actual model for the job and representative data is then sent to the benchmark machines and run. (Steps 608, 610).

Management platform 110 can be connected to the computers in the test platform 130 using a link separate from network 105, for example a LAN or other direct or local connection. Alternatively, the computers in the test platform 130 can be accessible through the network 105. For purposes of sending and receiving results of benchmarking, the computers in the test platform 130 can be treated by the management platform 110 in the same manner as a compute devices 115. Where each benchmark machine will operate on the same model and dataset a single common payload can be prepared to be sent to each and the processes can run substantially in parallel on each of the benchmark machines.

Although a single test computer with known operating characteristics can be used to get a benchmark measure of processing speed, in an embodiment, a plurality of test computers that are representative of the types of typical compute devices 115 that have or are expected to be registered are used. For example, the plurality of test computers can include different brands and models of smart phones, such as several different iPhone models running iOS, Android based smart phones, desktop computers with popular CPU configurations running the Windows operating system, etc. The test computers 130 will each run the appropriate app software for communicating with the management platform 110 to receive and execute jobs and return the result.

While the size of the sample portion of the compute data used for benchmarking can be comparable to the size of a data chunk used during actual processing of the job, it is typically expected to be much smaller since purpose of the benchmark is to measure compute speed for the model at issue using representative data, not to process large volumes of data. Notwithstanding, where processing speed is dependent on the values of the input data, a sufficiently large sample should be selected to allow for differences in processing times due to variations in the data to average out. For example, if the model is for an image processing algorithm, computation may take longer if the source image has more detail and so several pictures of different complexity should be processed for a more accurate benchmark.

In an embodiment, the data output from the model during benchmarking can be discarded. Alternatively, and particularly where the volume of data used in benchmarking is significant, the data can be stored and only the remaining source data chunked and distributed to compute devices for processing.

The time needed to process the data in benchmarking is then used to determine a processing speed for that submitted model and data. (Step 612). The benchmark data can be used to estimate the time a given compute device 115 will take to process a data chunk and this information used in selecting compute devices to use for that job and in allocating data chunks to them.

More specifically, given the benchmark data from one or more test machines, the time for a given compute device 115 to apply the submitted model to a data chunk of the submitted data can be estimated based on the benchmark time of the test machine(s). Where multiple test devices are available, the benchmark time for the computer in the test platform 130 that is considered to be the closest in expected operating characteristics to that computer device 115 can be used. Closeness of a compute device 115 to a particular test device can be measured by determining the magnitude of a similarity vector having dimensions with values based on the closeness of match to type or brand of device, model or version of a given type, operating system and operating system version, processor architecture, and other factors.

A scale factor can also be applied to benchmark processing speed to reflect differences in compute capability between the compute device 115 and the test platform device(s). Capability differences that can impact processing time include the type and speed of the CPU, availability of co-processing devices, the operating system, and the amount and speed of available memory and storage. Information used to scale the benchmark time for a given compute device can be obtained during initial registration of a compute device with the management platform 110. A scale factor can be estimated using device characteristics. In addition or alternatively, an initial benchmark test can be run on a new compute device during registration or at other times. The same or comparable benchmark test can be performed on devices in the test platform and the results used to provide a relative performance scale factor of the specific compute device 115 as compared to one or more benchmark test devices. This initial benchmarking test can be unrelated to any specific submitted compute job. Where multiple test devices are available, the benchmark time for the computer in the test platform 130 that is considered to be the closest in expected operating characteristics to that computer device 115 can be used to estimate compute device 115 performance. Closeness of a compute device 115 to a particular test device can be measured by type or brand of device, operating system, processor architecture, and other factors.

Figure 7:
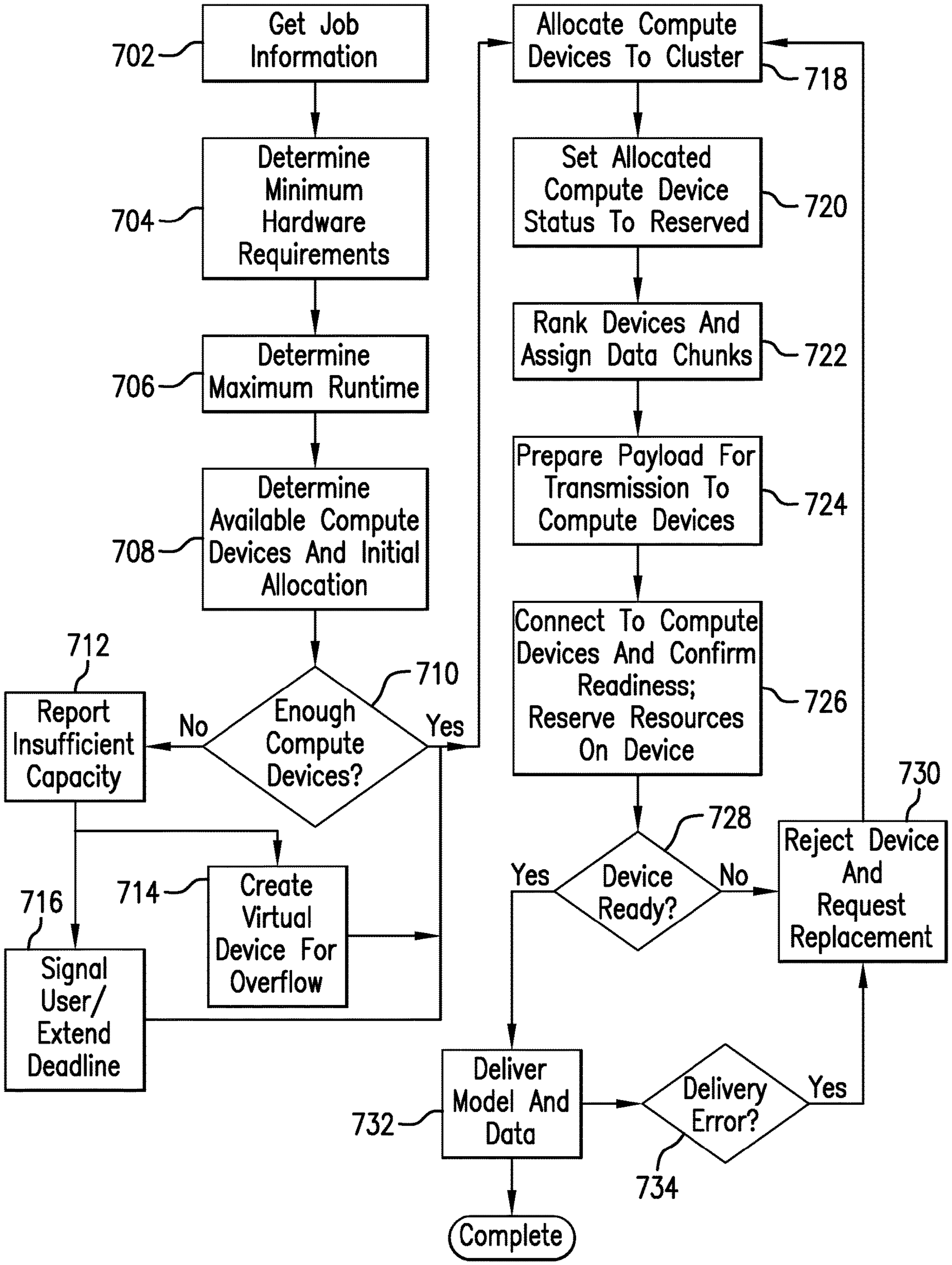
FIG. 7 is a high level flowchart of the general process of job deployment that can be performed within the management platform.

FIG. 7 is a high level flowchart of the general process of job deployment that can be performed within the management platform 110, such as in the admin engine 205 and payload manager 215. When a compute job is submitted for execution, the system compiles a list of available devices and then identifies a set of devices to service an aggregated compute request to meet specified criteria. For example, selection can be done to use the minimum number of devices and to have a projected time of completion which meets the job requirements. In an embodiment, job information is initially obtained. (Step 702). Minimum hardware requirements for a compute device to be used for that job are determined. (Step 704). The minimum hardware requirements can be determined by the type of model to be run, model size, and available storage space. For example, a compute device may have compute capacity suitable for some job types but not others. Available storage space should be sufficient to store the compute model, at least one data chunk to apply to the model, and results of the computation. (See e.g., FIG. 4, memory 310, 420, 425, 430). The available storage space can be used to determine how much data can be allocated to a given compute device as part of job deployment, and how many data chunks can be delivered in a batch vs. streaming data chunks over time.

A maximum runtime can be computed (step 706) and used for reference purposes. The maximum runtime is an indication of the length of time that it would take to execute the compute workload for the entire data set. Runtime can be computed using an average data processing speed over an aggregate of compute devices. Maximum runtime can alternatively be viewed as the maximum time available to complete the job before a specified deadline.

A check is made to determine which registered compute devices 115 are available. (Step 708). A compute device 115 can be considered available, if it is in a state in which it can receive a payload from the management platform 110. Availability criteria include factors such as device connectedness, and a measure of device health which measure can be comprised of the state of the device storage, CPU temperature, and state of charge for a battery powered device. In a further embodiment, the future expected availability of a compute device can be considered if the device is expected to be available before the management platform 110 is expected to send the new job and data to that compute device.

An initial allocation of the job to available compute devices can be done to confirm that there are sufficient compute devices available to complete the job in the allocated time period. The estimated data processing rate of the available compute devices determined in the benchmarking process can be used to estimate job completion time under various scenarios of device selection and data chunk allocation. If there are not enough compute devices (step 710), an insufficient capacity signal can be generated (step 712). Management platform 110 can signal a submitting user of the issue and adjust the target completion deadline to be consistent with the available overall capacity (Step 716).

Alternatively or in addition when the registered compute devices available for the management platform 110 to use do not have sufficient capacity to complete the total workload by the target completion time, a virtual compute device can be created or activated to provide the needed compute resources to meet the target. (Step 714). For example, management platform 110 can be configured to create a new virtual device on a conventional commercial cloud computing service, such as Amazon Web Services, or activate an existing but perhaps dormant virtual device previously set up on that service. The virtual device is then added to the set of available compute devices for use on that job and data chunks allocated and distributed with the model accordingly. Because third party cloud computing services typically charge for their use, use of virtual machines as a substitute for or to augment registered compute devices 115 can be limited to instances when the registered compute devices are insufficient to meet computation requirements. The protocol for communicating with the virtual machine to send the compute model and allocated data chunks may need to be done using a different protocol than with the compute devices 115 using the application software 140 for the system 100. Alternatively, a version of the application software 140 used with the compute devices can be loaded into the virtual machine allowing it to be treated by the management platform 110 in the same manner as registered compute devices 115.

After an initial device selection is made, device availability and resources on that device can be confirmed and devices allocated to a cluster. In an embodiment, once the resources available from a given compute device 115 is confirmed and the device selected, application software 140 be instructed to reserve, to the extent possible given the operating system of the compute device and other factors, these resources for a specified period of time so that the management platform 110 can rely on the specified confirmed resources for job allocation and distribution. Device verification and reservation of resources can be done at various stages during computed device selection.

The available compute devices are assigned to a cluster and set to a reserved status (steps 718, 720). In an embodiment, once the resources available from a given compute device 115 is confirmed and the device selected, application software 140 be instructed to reserve, to the extent possible given the operating system of the compute device and other factors, these resources for a specified period of time so that the management platform 110 can rely on the specified confirmed resources for job allocation and distribution. Device verification and reservation of resources can be done at various stages during computed device selection.

The management platform 110 system selects a set of compute devices 115 from a list of available devices based on the requirements of the compute job and with available metadata about the compute devices and assigns data chunks or a number of chunks to process to each in a disaggregation process. (Step 722). To increase security where serial processing of data is not required, the data records can be randomized and then sequentially assigned to devices (where the chunk size is a single record) or sequentially assigned to chunks which are then assigned to devices. A non-random striped selection of data records can also be used. Distributing data records in this manner can reduce the value of hacking into an individual device by removing or reducing information that may be gleaned by sequential data records. The order of the shuffled records is stored so that compute results can be arranged to match the record order as originally provided.

Selection factors can include available RAM and other storage space, network latency, and the computing platform hardware and software. Different compute models may require specific computing environments and so available devices can be filtered to exclude those that do not have the ability to execute the model that will be deployed. Execution speed estimates for the job, such as based on benchmark data, can also be used.

The selection of which compute devices 115 to use for a job and how the data chunks will be allocated between them can be made to prioritize one or more factors. The process can also select devices and the amount of the data provided for execution so that the workload assigned to a given compute device 115 uses at least a specified amount of maximum storage utilization, such as within a 10 to 15% of maximum storage utilization when considering the model size, size and number of data chunks to be sent, and memory needed to store data processing results until they can be offloaded for return to the management platform 110.

Given estimates of runtime speed of the model on available compute devices, selection can be made to give an estimated job completion time that satisfies a target completion time requirement. In such a selection, compute devices can be selected to meet the completion deadline while avoiding use of a faster compute device than is necessary.

A further consideration in device selection can be network latency between an aggregation point and the compute devices. Long latency can lead to compute interruption, data distribution interruption and the need to resend data to overcome potential losses. This can impact estimated completion times. Statistical estimates on impacts from network latency can be factored into the device selection when targeting job completion at or before a set time or to meet other criteria.

Yet an additional consideration in device selection can be the location of the compute devices. As part of verification of compute device availability, the device location can be queried and the current location recorded. A job submitter may have restrictions on where the job data can be sent. For example, some types of sensitive is subject to export control. Restrictions on the location of a compute device can also be used to filter available compute devices for selection.

After the set of compute devices 115 for use on the job has been selected, and data chunks assigned, a payload comprising the model and the assigned data chunks to the selected compute devices 115 for execution can be prepared. (Step 724).

Distribution of the payload data can be in the form of a complete and cohesive payload sent across the network connection. The entire set of compute data to be executed by a given compute device 115 can be sent up front, and all of the data for a workload is distributed during the initial job distribution among the designated devices during payload distribution. This has the advantage that an initial payload distribution can be done for the complete compute job. Alternatively, particularly when a given compute device 115 has limited storage, that device can be configured to receive or fetch as needed multiple payload chunks for a given compute workload, which chunks can be obtained in sequence. For example, a device with available storage for one payload chunk can be allocated three payload chunks and can have only an initial chunk delivered for processing. Successive chunks can be automatically requested by the device when an existing chunk is completed or pushed out by the management platform in response to an indication that the processing of the data chunk is complete, for example after receipt of the processed data for the completed chunk. Other methods can also be used. A particular distributed method for distribution of the model and data is addressed further below.

Prior to sending the models and data chunks to compute devices a connection to the selected compute devices 115 can be made to confirm readiness. (Step 726). Readiness can be determined by verifying that there is sufficient memory and other resources available to execute the compute workload. For a battery powered device an assessment of whether sufficient battery power to execute the compute workload is available. If a device is not ready, it can be rejected and a replacement device requested. (Steps 728, 730). Reallocation may need to be performed, at least in part, to substitute devices. Each compute device 115 can also be instructed to reserve resources for use in the upcoming job at this time if resource reservation has not already been done. If the device is ready, model and data payload is delivered (step 732). If there are repeated errors that prevent delivery the compute device can also be rejected and replaced. (Step 734).

In an embodiment, the compute model and the assigned data chunks are sent from the management platform 110 to the selected compute devices 115 using different transfer mechanisms. Each transfer mechanism has a corresponding software engine or agent on the management platform 110 and in the compute devices 115 to facilitate this. A first transfer mechanism can be in the form of conventional edge computing software designed to deliver payloads to edge devices and to operate within the edge device to extract and run the payload, such as payload manager 215 in the management platform 110 and payload service 410 in the compute device. The second transfer mechanism can be a streamlined message broker service used to transfer data chunks and also for more general event driven and other messaging between compute devices and the management platform, such as messaging engine 220 in the management platform 110 and messaging engine 406 in the compute device. Although separate transfer mechanisms are used, they differ primarily at the application and possibly the protocol layers but can make use of the same lower level communication layers to send and receive data over a network 105 to a specified network address.

One suitable platform for the first transfer mechanism is the Open Horizon (OH) platform. A suitable message broker service for the second transfer mechanism is Apache Kafka. An OH management hub on the management platform 110 can be used as the payload manager 215 to communicate with an OH edge agent acting as the edge service 411 installed on compute nodes 115. The OH edge agent 411 in the compute node 115 provides the compute model to an OH edge service which operates as the payload processing engine 412 in the compute node and which can execute the model on provided data. Although the OH platform allows data to be included in the delivery package, since each compute device has different data chunks to apply to the model, separate packages for each compute device are needed, and each package has its own copy of the compute model. This consumes system processor and memory resources at an increasing rate as the number of compute devices used for a given job increase. This delivery process also makes it complicated to reallocate data chunks from one device while continuing the same overall job.

In this embodiment, a single package that contains the compute model but without data can be generated and stored. That package can then be sent to each of the selected compute devices using the first transfer mechanism, such as OH. The data chunks assigned to each of the compute devices is transferred to them using the second transfer mechanism. Additional functionality in the application software 140 at the compute device receives data chunk and stores them in memory so that the edge service can apply the data to the received compute model. Likewise, the second transfer mechanism could also be used to return compute results from a compute device to the management platform.

Figure 8:
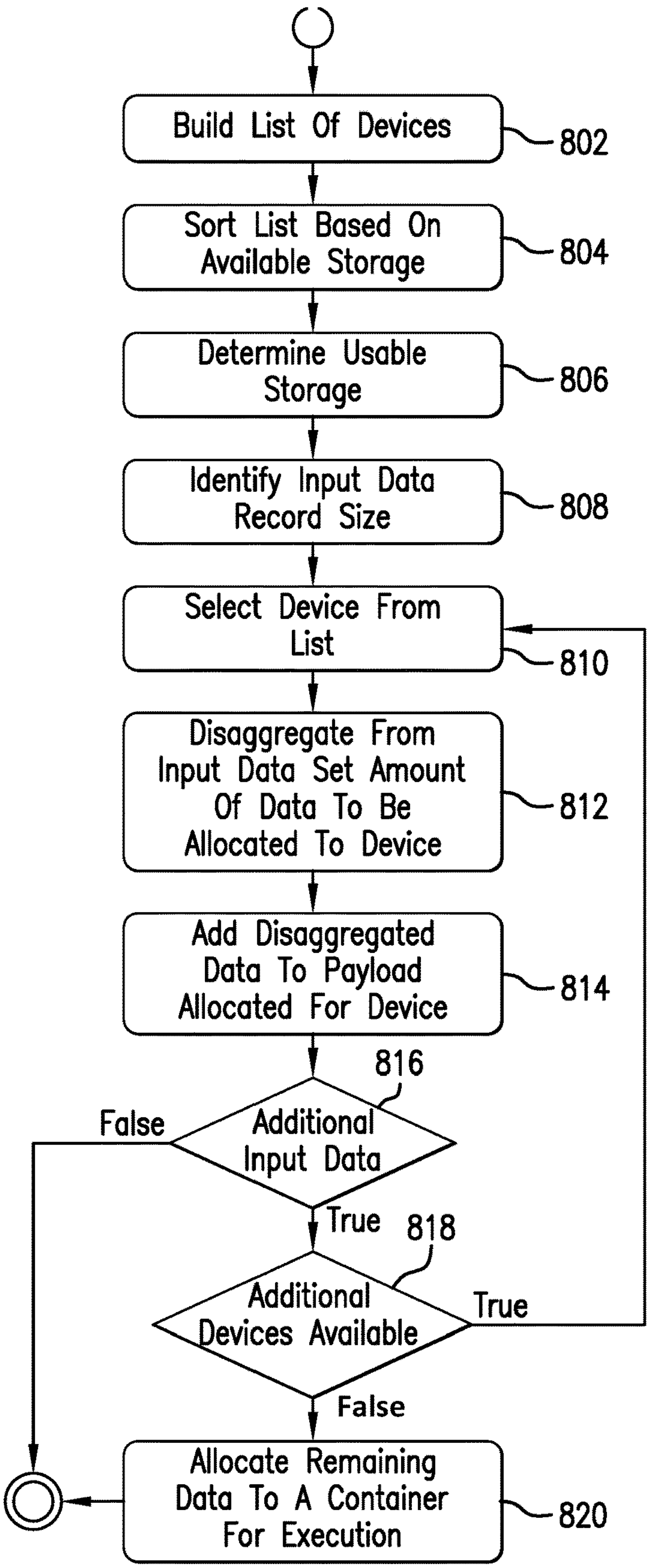
FIG. 8 is a high level flowchart of selection of compute devices and disaggregation of data across multiple compute devices.

An embodiment of selection of compute devices and disaggregation of data across multiple compute devices is discussed in more detail with respect to the flowchart of FIG. 8. Initially a list of available devices is built (step 802). The list is then sorted based on desired optimization. For a storage-optimized disaggregation, the list of devices is ordered by size of available data storage (step 804), and from that the storage usable for payload applications is determined (step 806). To ensure there is sufficient storage, only a percentage of the actual available storage can be considered, such as 80% so that if a device as 1 GB of actual available storage, for payload allocation only 0.8 GB will be counted.

Other constraints can be used in selection of devices, such as working RAM and CPU type and speed or estimated data processing speed for the present job based on benchmark data. For example, devices can be ranked by suitability for model execution, considering whether there is a GPU or just a CPU and if the difference will impact job execution; whether execution of the model will result in processor demand exceeding a specified threshold, which threshold can be configured during compute device registration or at other times; the percent of overall data payload that can be allocated to the device without exceeding a configured device threshold of remaining capacity, and network latency. A data chunk size is also selected (step 808). Chunk size can be determined based on initial job information provided by the user, by the sizes of files or data segments uploaded with the job, or by other means.

Compute devices are selected in sequence from the sorted list and chunks of input data are allocated to the device and added to payload to be sent to the selected device. (Steps 810-814). Devices are considered in turn until all of the data chunks have been allocated. (Steps 816-818). Allocation can consider the benchmark data processing speed estimate for each compute device in order to provide a final allocation that will complete prior to the target deadline with a predefined buffer, such as 10% or 15%. When optimizing for storage, the maximum number of data chunks that can be assigned to the selected device for delivery at one time can be chosen. For example, when multiple chunks of data are to be sent up front, the maximum number of chunks which can be stored and for which there is room to store output data is selected. Data chunks are allocated to avoid splitting records. For example, if a record length is 1K (1024 bytes) and there are 5000 bytes available, only 4096 bytes of data are allocated. Device selection can also be made so as to use the slowest devices first, leaving faster devices available for use with other jobs where slow devices may not be suitable. It should be noted that this process may result in some of the selected computed devices not being used. In such a case they can be released for use in subsequent jobs. If data has been allocated to all selected devices and additional data is still available, the remaining data can be allocated to a container that can be applied to virtual device and a device activated if not already done. (Step 820).

Instead of directly allocating the data and building payloads during the allocation process, the initial disaggregation process can instead determine the number of data chunks to be assigned to a given device. The actual data chunks assigned to be processed by a given device can then be assigned after all allocation is completed. The allocated data chunks can be sent in a batch. Where data chunks are streamed over time, a compute device can be informed of the number of assigned data chunks and the assignment of specific chunks made at the time when the next chunk need to be sent. This variation can simplify reallocation of compute devices as may be needed.

In an example of sizing of an individual device, a compute device may have native storage of 2 GB and starting free disk space of 1 GB. The available space is reduced by the buffer for data output and reserve. A buffer of 20% results in 800 MB of disk storage. Assuming a model and algorithm storage requirements of 5 MB results in 795 MB of storage available for input data.

In an example of device selection, a compute workload comprises a 256 MB model and a total of 1 GB data payload. The system determines supportability of a workload based on specific payload requirements, which requirements may comprise both minimum size requirements of computational model or algorithm and resulting data storage availability of devices. From the available devices, the model and portions of the data are distributed to optimize the desired parameters. Devices that do not have enough storage to support the model are not selected. Likewise devices that do not have sufficient memory to store the minimum size data chunk and results of data processing are not selected. From the remaining devices, the data chunks are distributed based on available storage.

Table of devices showing resource availability and payload chunk allocation:

| Node | Metadata (CPU, Storage, RAM) | PayloadChunk (Data, Model) |
|---|---|---|
| Node Device 1 | (3.2 GHz, 500 MB, 2 GB) | (144 MB, 256 MB) |
| Node Device 2 | (2.1 GHz, 600 MB, 2 GB) | (244 MB, 256 MB) |
| Node Device 3 | (2.4 GHz, 250 MB, 2 GB) | - Not selected - |
| Node Device 4 | (3.1 GHz, 700 MB, 2 GB) | (348 MB, 256 MB) |
| Node Device 5 | (2.2 GHz, 250 MB, 2 GB) | - Not selected - |
| Node Device 6 | (2.1 GHz, 500 MB, 2 GB) | (144 MB, 256 MB) |
| Node Device 7 | (3.2 GHz, 500 MB, 2 GB) | (144 MB, 256 MB) |
| Node device 8 | (2.4 GHz, 200 MB, 2 GB) | - Not selected - |
| Total | | 1024 MB Deployed data payload with Model |

In the table above, devices that do not have the minimum amount of storage available are not selected. The list has already been filtered to identify node devices with the amount of RAM deemed optimal for the given workload.

Figure 9:
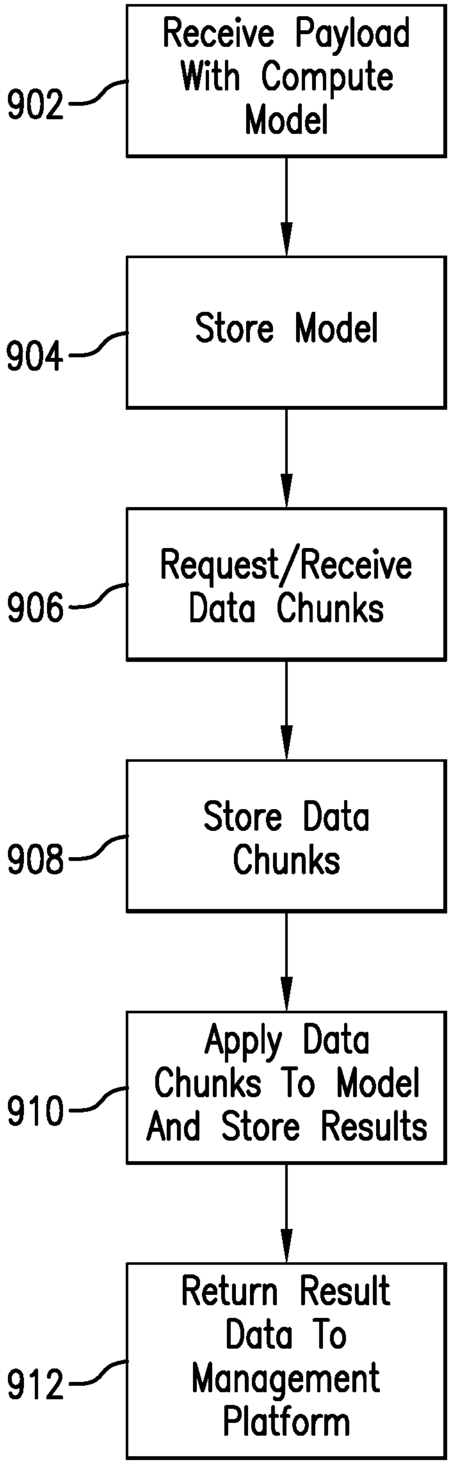
FIG. 9 is a high level flowchart of operation of the application software 140 on a compute device.

FIG. 9 is a high level flowchart of operation of the application software 140 on a compute device 115. As discussed, a compute device 115 can receive a payload that includes a compute model. (Step 902). The compute model is stored, such as in storage 420. (Step 904). Data chunks to apply to the compute model are also received (step 906) and stored, such as in storage 425 (step 908). Depending on implementation, data chunks can be received in an initial batch, either as part of the payload sent to the payload service 410 or through the separate messaging service 406. Application software 140 can also determine that additional data chunks are needed and issue a request to the management platform 110, such as through the messaging service 406. The payload processing engine 412 applies data chunks to the model and stores the results, such as in storage 430. (Step 910). Results of the computation are then returned to the management platform 110 (step 912)

Results can be returned on an intermittent basis, such as on completion of processing of a single data set or results from a plurality of processed data chunks can be accumulated and saved in the compute device and returned as a batch. Results can be returned in a result package that includes a compute workload identifier which is used by the management platform to associate the results with a known compute workload. For security, identification can be at the results set level but anonymized with regard to the data owner. Encryption can also be used to more securely send the data chunks and processing results.

Each data chunk can have its own unique identifier and this can be referenced in the data processing results returned for that chunk. The identifier can also be used to place sets of results from job in the proper order. In the case of non-series data the compute workload identifier will still allow the results it returns or generates to be associated with a known compute workload request.

Figure 10:
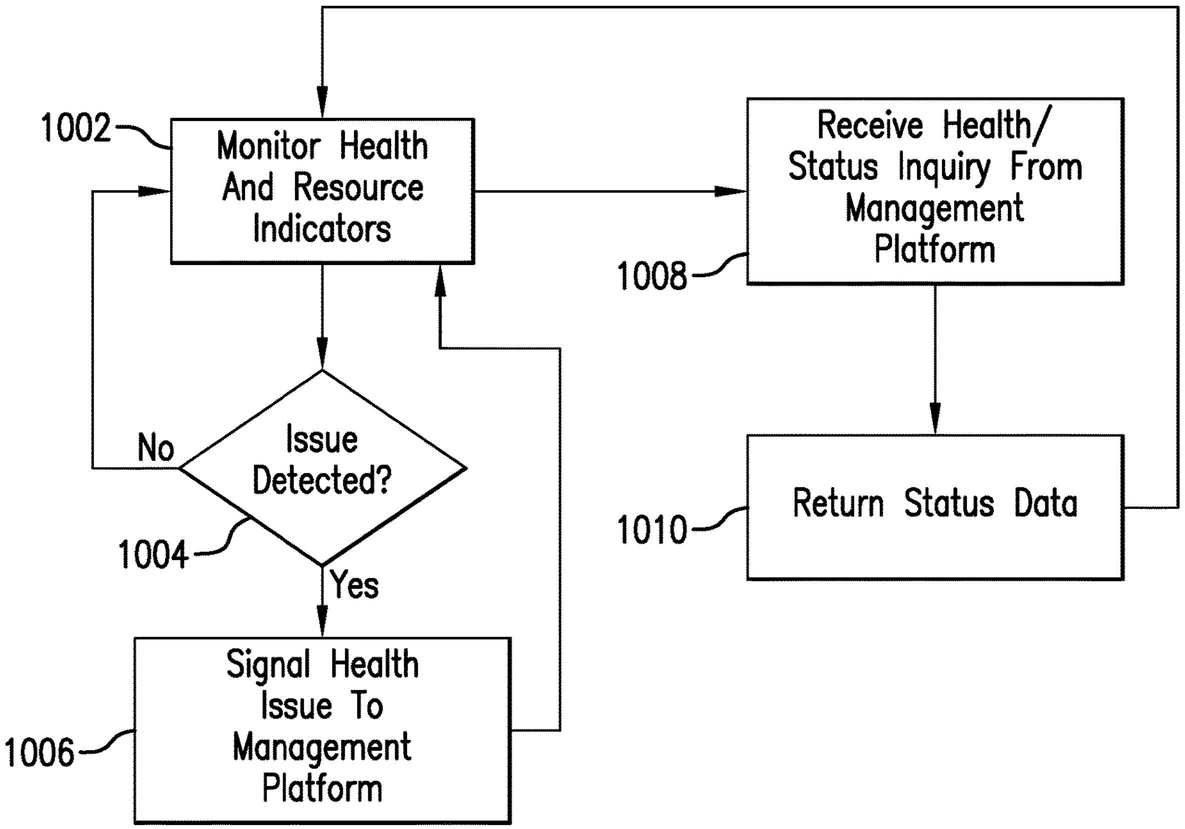
FIG. 10 is a high level flowchart of health and resource monitoring on a compute device.

Application software 140 on a compute device 115 can also operate to monitor device health to detect conditions that may impact the speed in which an assigned workload is completed or the ability to complete it at all. With reference to FIG. 10, a health and resource monitoring module 440 in the application software 140 can periodically poll or monitor system status while a workload is being processed. (Step 1002). The health monitoring module can rely on native health monitoring functionality built into the compute device's operating system, firmware, and/or hardware and respond to relevant interrupts triggered by such native functionality. Conditions that are monitored or can be signaled by interrupts include CPU temperature, low memory or available storage, and low battery charge. When a health condition is detected (step 1004) the application software 140 can send a health alert message to the management platform 110 about the condition (step 1006). In response, the management platform 110 can reassess the estimated completion time for the data chunks assigned to that compute device in view of the reduction in resources, and determine whether the data chunk allocation for that device can be maintained without missing the target completion deadline or other performance metrics. If execution speed, available memory, or another needed resource on the compute device 115 is no longer sufficient, some or all of the data chunks assigned to the ailing compute device can be reassigned to a different compute device, which may be another device already selected to run the given compute job, or a separate compute device not already in use for this job. When a workload needs to be reassigned, that workload can be treated as if it were a new job workload for purposes of identifying devices to allocate that portion. Device selection for workload reassignment can be prioritized over selection of devices to allocate to new jobs. If registered compute devices are not available, a virtual device can be activated.

Reassignment of a workload portion assigned to a given device may also be necessary if a device goes offline or is otherwise not performing at the expected level even if a health alert is not received. For example a network connection to a compute device may be lost for an extended period of time or software or hardware issues on the device may be compromising performance and yet not be reported. In the event that a given compute device not does reestablish a network connection or return the results payload by the expected completion deadline, the device can be considered to be unavailable to complete the job request. If the data is being delivered to the device via a streaming protocol, the device can be considered unavailable to complete the job request, after some number of attempted payload delivery retries.

Given that many types of edge nodes will maintain transient network connections, the system 100 can allow devices to continue to persist in a disconnected state, for some period of time. The amount of allowable disconnected time can be dependent upon the anticipated time it will take a compute device to execute the workload. This estimate can be based on when one or more data chunks were provided to a given compute device, the size of the data chunks, and the benchmark derived processing speed of that compute device. The amount of offline time that is tolerated can also factor in the data payload delivery method, which will be known prior to deployment of the payload.

Figure 11:
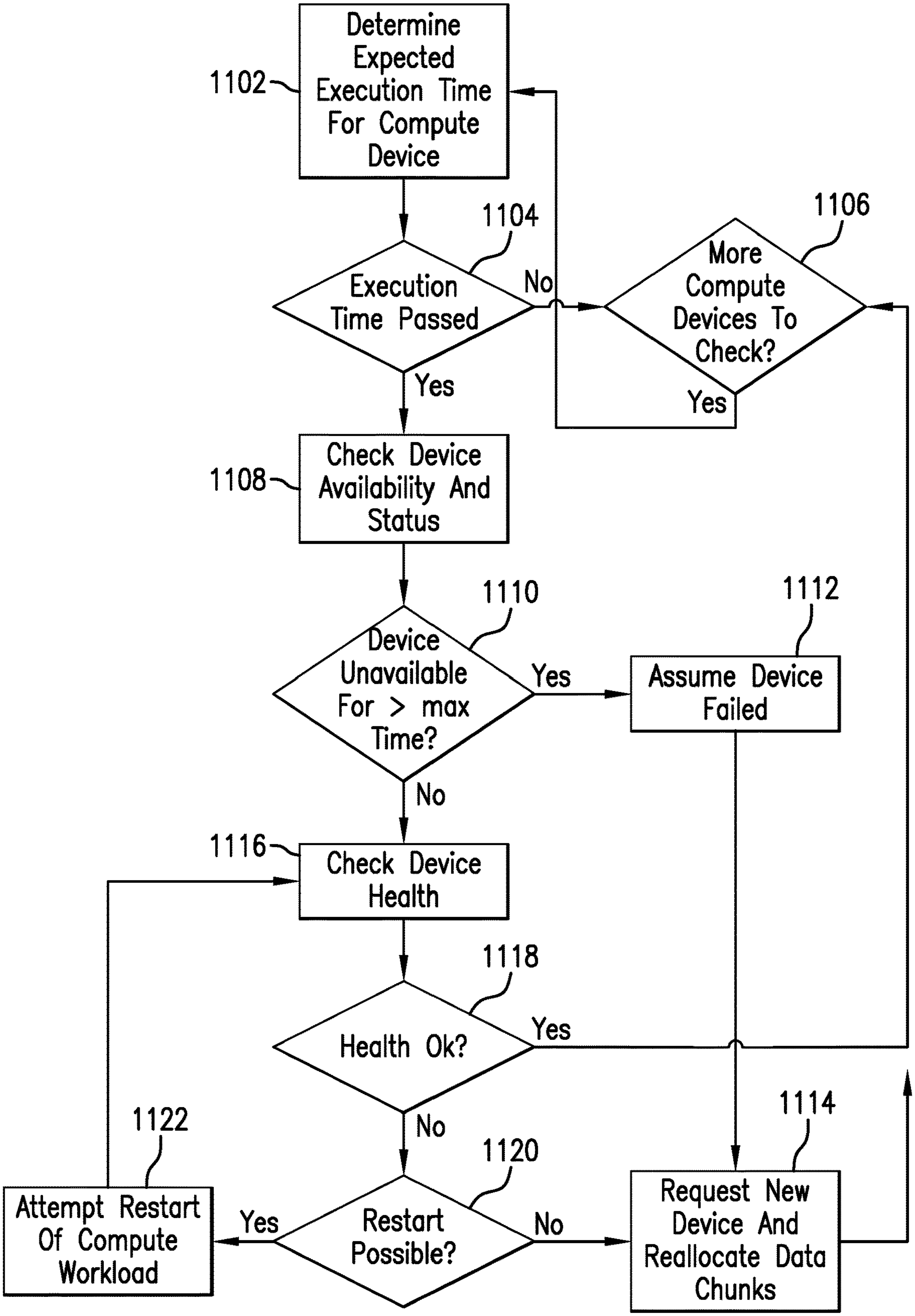
FIG. 11 is a high level flowchart of a health and status monitoring function that can be performed on the management platform.

FIG. 11 is a high level flowchart of a health and status monitoring function that can be performed on the management platform on a periodic or continual or aperiodic as needed basis. The predicted data processing speed of a compute device 115 is used to determine when results from that compute device should be received (step 1102). Optionally, if the execution time has not passed (step 1104) the next device can be checked (step 1106). Next the device availability and status is checked (step 1108). This can involve querying the compute device to return health and status information and/or checking most recently received data. (Step 1108). If the computed device is unavailable for longer than the maximum allowable time (step 1110), it is assumed that the device has failed (step 1112). A new device can be requested and unprocessed data chunks reallocated to the replacement device, the new device added to the cluster and payload deployed. (Step 1114). If the device is available its health is checked (step 1116). If the health is not compromised (Step 1118), the next compute device can be checked. If the health is not Ok, the impact is considered, including whether a restart of the compute workload is possible (step 1120). If a restart is not possible or the health status is such that the allocated data chunks cannot be completed at all or in the required time, some or all of the data chunks can be reallocated to a different node (step 1114).

In some cases, it may be necessary for a compute device that is being used to process a workload to recapture resources assigned to a workload to be used for other purposes. For example, if a compute device is a laptop computer, a user of the laptop may need to run a resource intensive program. In an embodiment, the end-user application can allow this to occur.

Users of external devices who register the management platform 110 and install application software 140 that makes their devices available as compute devices 115 can receive financial or other compensation when the device is used by the management platform 110 to run a job. One measure of compensation can be based on the volume of data a given compute device processes.

A user of a compute device 115 to which a workload has been allocated may need to use that compute device for other purposes during the time the workload is expected to run. This use may reduce the resources available for execution of the workload, and result in a decrease in the workload data processing speed. The application software 140 on the compute device 115 used as part of the system 100 can monitor system activities to detect when such resources reduction may occur and if the resource reduction is more than a given threshold. A measure of the impact of a task can be based on whether available CPU cycles are reduced by a predefined amount. Impact can also be from a reduction in available memory for storage of workload compute results leaving insufficient memory available to store the results from processing of a relevant number of data chunks, such as one chunk, the total number of chunks stored in the compute device for processing, or the total number of chunks assigned to the compute device even if not all have been delivered. Consideration of whether the reduction in resources is or is expected to be transitory can also be considered.

If the resource reduction exceeds a given threshold for longer than a predefined time period, it can be treated as analogous to a health alert, and a message can be sent from the compute device 115 to the management platform 110 indicating the resource change (such as effectively slower CPU, less memory, etc.). The management platform 110 can in response assess the change and determine whether the impact is sufficient to require a reallocation of data chunks from the signaling device to a different compute device and, if so, take appropriate action in the same way as a health alert is processed.

The application software 140 on the compute device 115 can also monitor other activities on the compute device 115, such as activities unconnected with system 100, to determine whether an actual or potential resource reduction is due to user action such as starting a new application or task, as opposed to a required activity by the operating system. When the reduction is due to user action, and particularly if such a reduction could impact operation on assigned compute jobs by more than a threshold measure indicating the reduction is very significant, a message can be output on a display of the compute device 115 informing the user that continuing with that action would require use of resources allocated for an active workload. In an embodiment, the application software 140 may act to temporarily suspend or reduce the priority of the new resource consuming task until the user affirmatively indicates that the task should continue. Should the user continue the resource consuming task, a penalty, financial or otherwise, can also be assessed against whatever compensation the user would otherwise receive for making the particular compute device available.

As noted, when a compute device 115 has completed processing a workload the compute results are returned to the management platform 110. The application software 140 can send the results to the management platform 110 directly through the network 105. In some cases however, a direct network connection is unavailable. With reference to FIG. 1, device 115*a* is connected to network 105 over data link 106, which can be, for example, a cellular data internet connection or a Wi-Fi connection with a node with internet access. At times network connection 106 may be unavailable to device 115*a*. If a connection to network 105 is not available and a compute device, such as device 115*a*, has completed a workload and has compute data to return to management platform 110, device 115*a* can establish a connection with another nearby device, such as compute device 115*b*, using an alternative data connection, such as a direct Wi-Fi connection, or a connection using a Bluetooth, Bluetooth Low Energy (BLE), or NFC protocol. Completed compute results can be transferred from compute device 115*a* to compute device 115*b*. Compute device 115*b* will then transfer results from device 115*a* to the management platform 110.

To help in establishing such a connection the application software 140 in a compute device can have the device broadcast its presence in a manner that can be discovered and recognized by other compute devices within range. For example, compute device 115*b* can periodically transmit a BLE advertising message indicating its availability for connection as a BLE follower device. The advertising message can also include payload data, such as a local name, which includes an indication that the compute device 115*b* is running application software 140. To establish a data connection between two devices, a follower device transmits advertising messages indicating that it is available for a connection. A central device scans for advertising packets. When an advertising packet from a suitable follower device is detected, the leader device sends a connection request packet to the follower and, provided the follower responds appropriately, establishes a data connection.

An NFC data connection provides a reasonably high speed data link but only over a short distance, such as about 10 cm. The option to connect over an NFC link allows a party to place one compute devices 115 that may need to transfer compute result data or transfer a compute job in close proximity to a second compute device and the application software 140 in the devices will perform the transfer. One scenario where this may be useful is where a job is running on a mobile device that has reached a low battery level status. The low battery compute device can be placed next to a second compute device that is adequately powered to transfer data and/or the compute job to the second device.

Figure 12A:
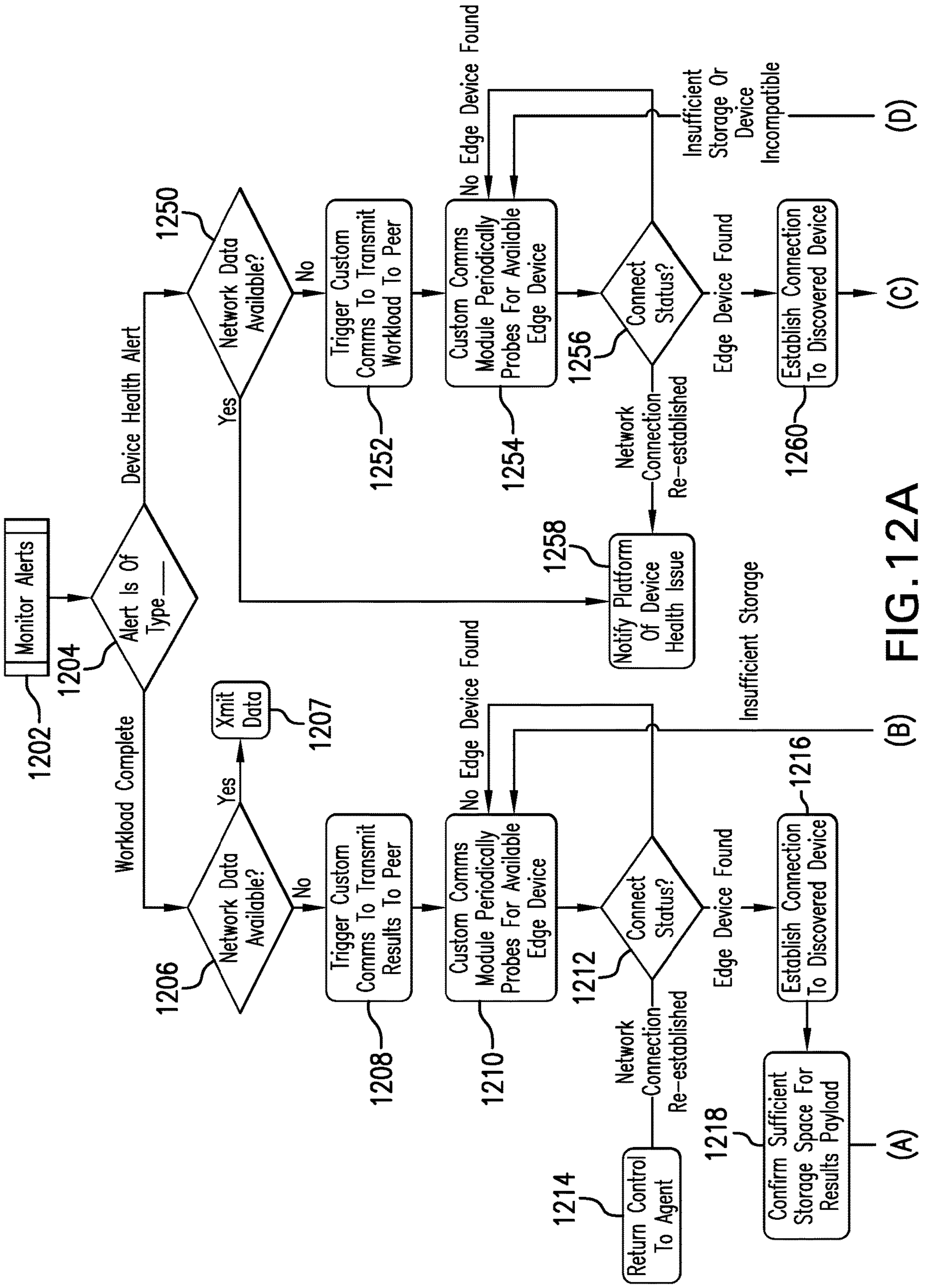
FIGS. 12A-12C is a high level flowchart showing an alert monitoring process that can result in the transfer of data and/or an assigned compute job from one compute device to another.
Figure 12B:
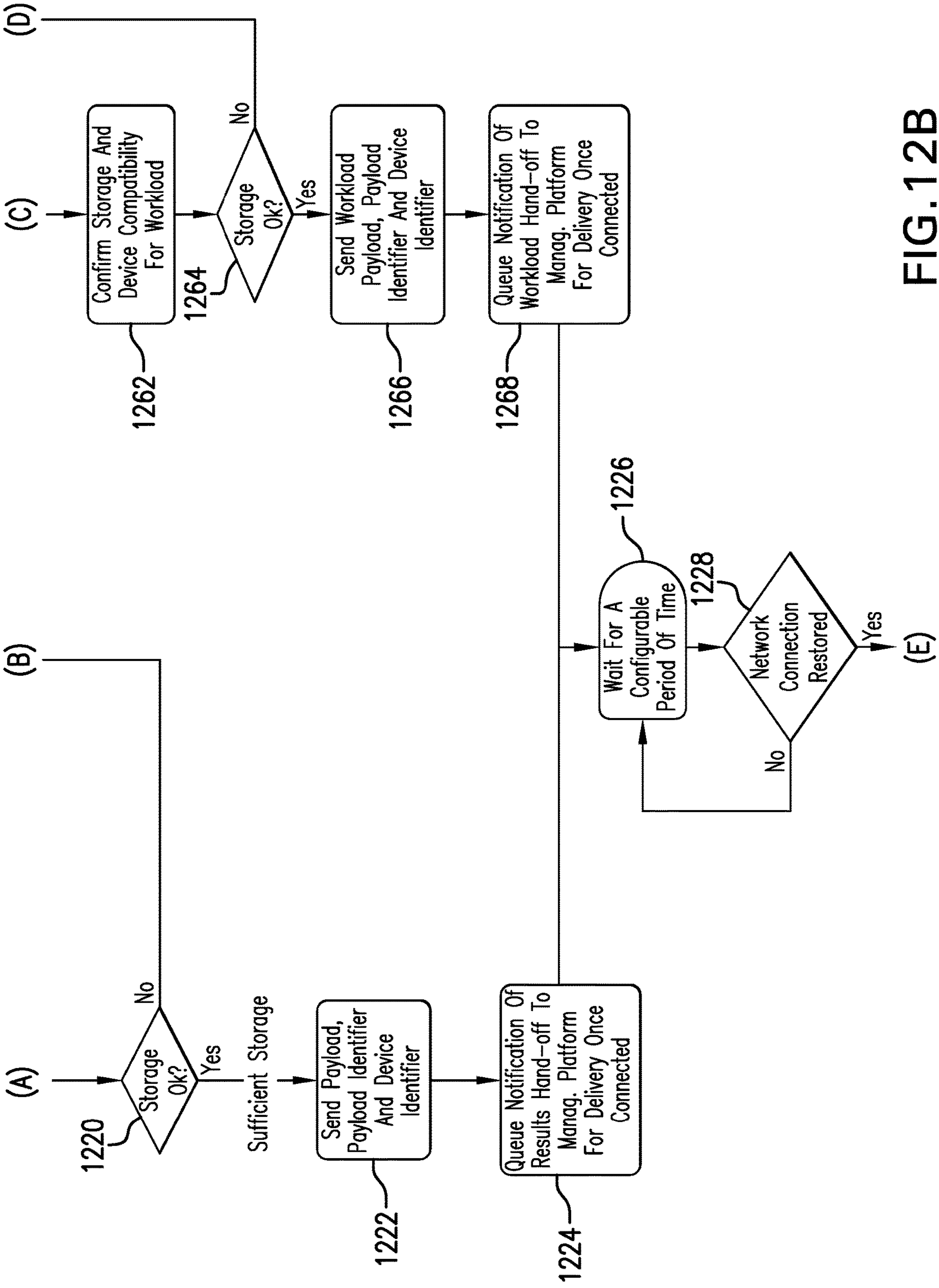
Figure 12C:
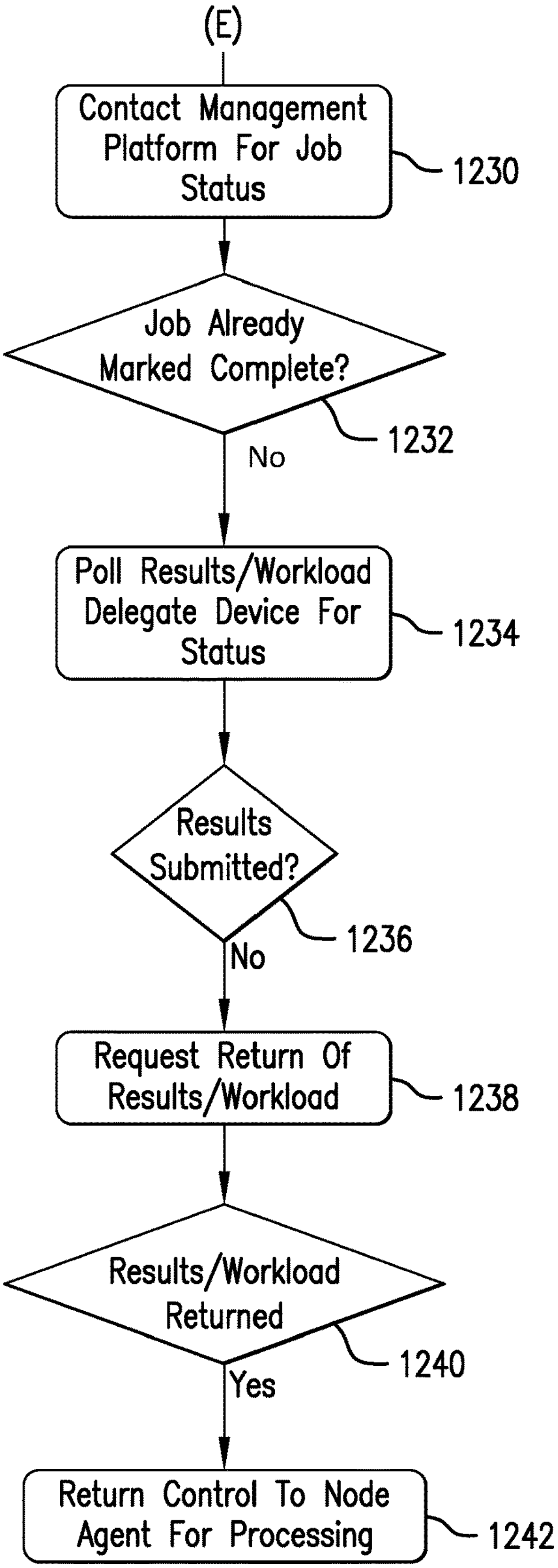

FIGS. 12A-12C is a flowchart showing an alert monitoring process that can result in the transfer of data and/or an assigned compute job from one compute device to another.

Health and resource monitor 440 on device 115*a* can monitor status and or device generated alerts and in response notify the supervisor service 405. Alerts from the payload processing engine 412 can also be monitored (step 1202). When an alert is received, the response depends on the alert type (step 1204). In the case of a workload complete alert, a check on network data transmission availability is made (step 1206). If the data network is available, the result data is returned (step 1207). Otherwise a process to transfer the result data to a peer device is initiated (step 1208). The system may require that network data remain unavailable for more than a threshold period of time before starting an offload process.

The software on device 115*a* will periodically check for the presence of an edge compute device that is running suitable software, such device 115*b* with its application software 140, to allow for data transfer. (Step 1210). Checking can be done on one or more available networks, such as Wi-Fi, Bluetooth, and NFC. In addition a check of normal network status can be made and if that network connection is reestablished, the normal process for returning compute data is resumed. (Steps 1212, 1214).

If a suitable device is found, a connection is established to that device (Step 1216). The status of the connected device 115*b* is queried, which can be done in manner similar to a device query from management platform 110, and a determination is made as to whether device 115*b* has sufficient storage to receive the computed data. (Steps 1218, 1220). The application software 140 on the queried device can determine available storage not already allocated or reserved for use, such as in connection with its own compute job, and return that data or the queried device can return data more generally about available and allocated storage and the determination of amount of storage made on the initiating device.

If sufficient storage is not available, a connection to a different device can be tried. If sufficient storage is available a payload with the computed data is prepared and sent along with data to identify the payload contents and the device from which it originated. (Step 1222). A message for the management platform 110 is also queued for delivery to inform it of the data handoff (step 1224). Each compute device has its own ID. As part of the data handoff, the compute device 115*a* device forwards its own ID to the connected other compute device 115*b*. This information is included as part of data that is subsequently forwarded by device 115*b*, such as to the management platform 110. This allows the management platform 110 to track forwarding that occurred. If device 115*b* has network connection issues it may at some point initiate its own process to forward data. It is possible that device 115*b* may try to connect to device 115*a* before the data from device 115*a* has been returned to management platform (or forwarded to a different device 115). If a compute device is in a situation where it may be returning data to a device from which it obtained that data in the first place, the target device can be queried to indicate its network status and the data returned to that device only when there is a network connection allowing it to be returned to the management platform 110 so as to avoid repeatedly passing data between devices that lack a suitable network connection for data return.

The process is similar if the alert is a device health or resource alert (step 1204). If a network data connection is available (step 1250), a message is sent to the management platform 110 indicating it of this issue (step 1258). Assuming the network connection remains active, the management platform 110 can manage a reallocation of the compute job.

If a network connection to management platform 110 is not available a process to initiate a transfer of the compute job workload to a different compute device is initiated. (Steps 1250, 1252). The software on device 115*a* will periodically check for the presence of an edge compute device that is running suitable software, such device 115*b* with its application software 140, to allow for data transfer. (Step 1254). In addition a check of normal network status can be made and if that network connection is reestablished, the management platform can be notified of the alert. (Steps 1256, 1258).

If a suitable device 115*b* is found, a connection is established to that device (Step 1260). The status of the connected device 115*b* is queried, which can be done in manner similar to a device query from management platform 110, and a determination is made as to whether device 115*b* has sufficient storage to receive the computed data. (Steps 1262, 1264). If sufficient storage is not available, a connection to a different device can be tried. If device 115*b* has sufficient storage available to receive the workload payload, it is sent from device 115*a* to device 115*b* along with appropriate device and job ID information and a message to the management platform is queued to inform it of the transfer when network connection is reestablished. (Steps 1266, 1268).

If device 115*b* is not running any job, then the model and data from device 115*a* can be sent to it, and device 115*b* can treat it in a manner similar to receipt of a job directly from the management platform 110. Device 115*b* can also message management platform 110 to inform it of the transferred job. In general, a job transfer will not be done if device 115*b* is already running a compute job. However, if device 115*b* is running a job with the same compute model as device 115*a* but only with different data chunks, a transfer can also take place with only the data chunks transferred (or, where data chunks are streamed on demand only the data chunk IDs). Device 115*a* can hold device 115*b* in reserve first and attempt to find another compute that is not currently assigned a job. It will be appreciated that increasing the number of data chunks device 115*b* has to process will impact the completion time of the job by device 115*b*. However since device 115*a* is presumed to be unable to process its job in a meaningful manner, the transfer allows the processing to continue and management platform 110 can subsequently transfer the device 115*a* data chunks from device 115*b* to another compute device as may be appropriate.

After a handoff the compute device 115*a* may periodically check to see if the network connection has been restored (steps 1226, 1228). When the connection is back, the management platform 110 can be contacted to check the status of the job/job results that was handed off (step 1230). If the management platform 110 indicates that the job was completed by a different device (step 1232), device 115*a* can contact device 115*b* to which the handoff occurred to check the status of the handoff. (Step 1234). If the connection between devices 115*a*/115*b* is no longer active a reconnect can be attempted. If device 115*b* is no longer in range or otherwise cannot be reached the status check can be aborted.

In both a data result handoff and a job processing handoff scenario there is the possibility that while the compute device 115*a* was not connected to the network the management platform 110 determined that the compute device 115*a* was offline and already transferred the workload to a different compute device. If management platform 110 indicates that it has already received the results expected from device 115*a*, device 115*b* can be informed and the transferred data deleted/transferred job canceled. When management platform 110 has not received the job results, device 115*b* can be signaled to request a return of the transferred result data so that device 115*a* can return it to the management platform 110. Likewise, compute device 115*a* can request return of the transferred workload in whole or in part, such as if computed device 115*b* is currently processing a data chunk and additional chunks to process remain. (Steps 1236-1242). A return transfer of compute results data or a workload can be done in a manner similar to the initial handoff process.

Figure 13:
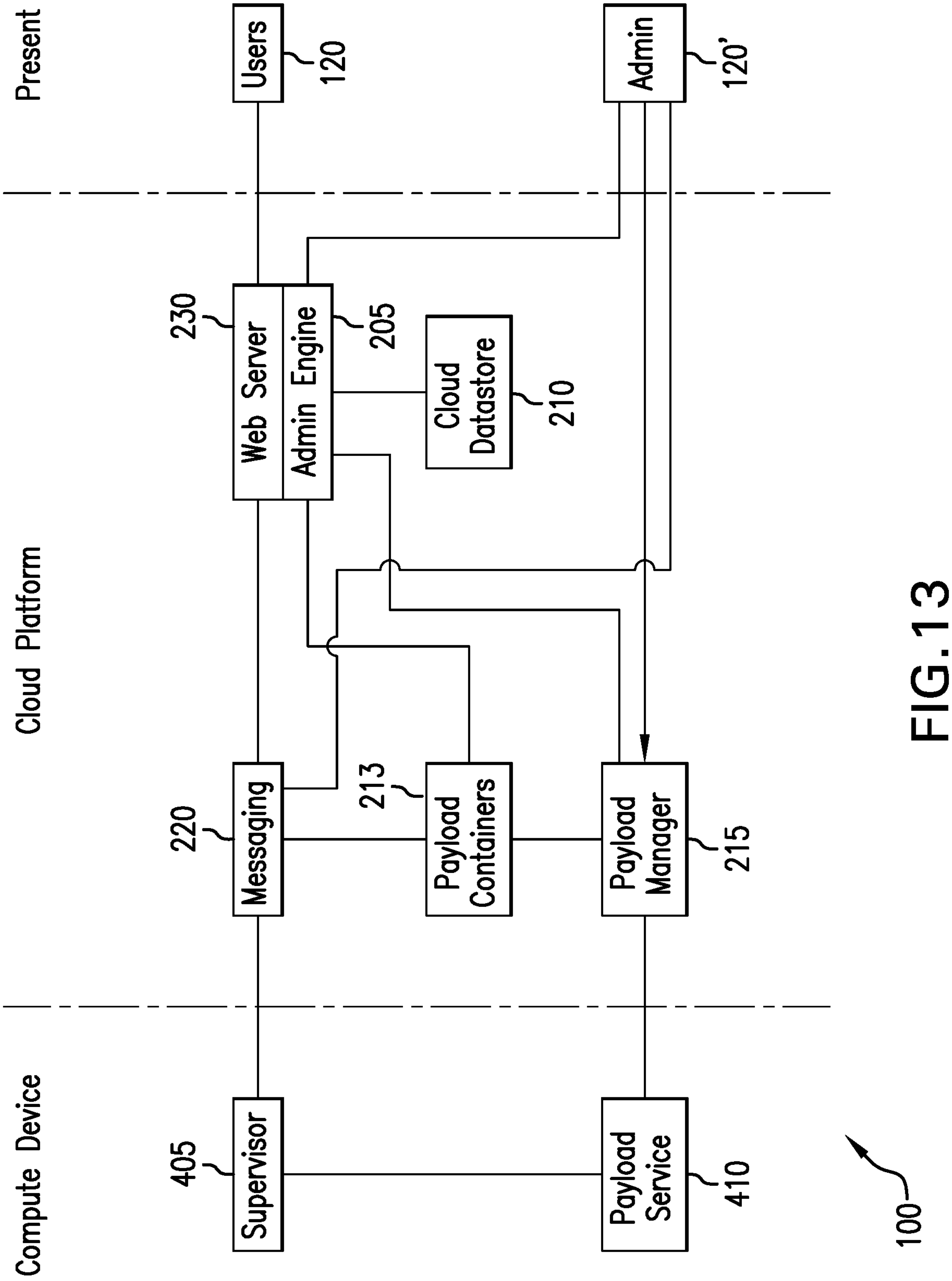
FIG. 13 is a high level diagram of communication and data flow between various elements of the system in a cloud computing implementation.

FIG. 13 is a high level diagram of communication and data flow between various elements of the system 100 in a cloud computing implementation. Admin engine 205 is shown in combination with web server 230. Likewise, various other modules and engines in the cloud platform can be combined in different ways provide the same overall functionality. Admin engine 205 connection to the payload manager 215 can be used to register and manage compute devices and to publish service meta data about them. Payload data can be stored by the web server in payload container storage 213. The administration engine/web server 230 can also access other cloud data storage to store and retrieve other data.

Payload manager 215 can access payload data from the payload container storage 213 and connect to the payload service 410 to provide compute model payloads to a compute device. The connection to payload service 410 can also be used to check payload processing status, and handle other payload infrastructure tasks. The connection from the administration engine to the messaging service 230 can be used for communication with compute devices 115 and to push/pull data about the service and to send data chunks to compute devices, which chunks the messaging service 220 can obtain from payload container storage 213 or other storage.

An administrator 120' can connect to the system via the web server interface 230 to access functionality of the admin engine 205, such as creation and management of user accounts and compute devices. An authorized administrator can also access the system using a messaging app and through messaging service 220. A connection to the payload manager (directly or via a front end interface such as web server 230 or messaging service 220) can be used for management of deployment and compute node registration with patterns or policy to deploy the system to appropriate edge node compute devices. Regular users can access system 100 via the web server 230. The user link can be used to create and manage user accounts, publish and manage edge services and compute payloads, and register/manage their own compute nodes.

Various aspects, embodiments, and examples of the invention have been disclosed and described herein. Modifications, additions and alterations may be made by one skilled in the art without departing from the spirit and scope of the invention as defined in the appended claims.

The invention claimed is:

1. A method for distributing data processing jobs to a plurality of compute devices in a distributed computing environment, the method performed by a computer platform comprising at least one computer system, the method comprising the steps of:

receiving at the computer platform a job payload comprising a compute model and job data to be processed by the compute model;

dividing the job data into a plurality of data chunks;

sending the compute model and a benchmark data set extracted from the job data to a benchmark compute platform;

receiving from the benchmark compute platform an indication of benchmark job computation speed for processing of the benchmark data by the compute model;

selecting a cluster of compute devices from the plurality of compute devices and allocating each of the plurality of data chunks to a respective compute device in the cluster such that for each respective compute device in the cluster, an estimated duration to complete processing of allocated data chunks with the compute model is less than a first predefined duration, and wherein the estimated duration is determined based on the benchmark job computation speed;

sending each respective compute device in the cluster the compute model and the data chunks allocated to the respective compute device in the cluster; and receiving from respective compute devices in the cluster compute result data sets, each compute result data set associated with a respective data chunk.

2. The method of claim 1, wherein the selection of the cluster of compute devices and allocation of the data chunks to the respective compute devices in the cluster is such that for each respective compute device in the cluster, the estimated duration to complete processing of allocated data chunks with the compute model is greater than a second predefined duration, the second predefined duration being less than the first predefined duration.

3. The method of claim 1, further comprising the steps of:

identifying an insufficient compute resource condition wherein a cluster of compute devices cannot be selected from available compute devices in the plurality of compute devices and data chunks to be allocated to the compute devices in the cluster so as to provide an estimated duration to complete processing of the data chunks that is less than the first predefined duration; and in response to the insufficient compute resource condition, creating a virtual compute device and making the virtual compute device available for inclusion in the cluster of compute devices.

4. The method of claim 1, wherein the step of sending each respective compute device in the cluster the compute model and the data chunks allocated to that respective compute device comprises the steps of:

sending the compute model to the respective compute devices using a first data transfer process; and sending the data chunks to the respective compute devices using a second data transfer process different from the first data transfer process.

5. The method of claim 1, the benchmark platform comprises a plurality of benchmark devices each having a respective device type including at least a first device of a first device type and a second device of a second device type different from the first device type; the indication of benchmark job computation speed comprising a plurality of benchmark speeds, each benchmark speed associated with a respective benchmark device;

the estimated duration to complete processing of allocated data chunks by the compute model for a respective compute device in the cluster being determined based on the benchmark speed of a benchmark device in the plurality of benchmark devices that is most similar relative to remaining benchmark devices to the respective compute device in the cluster as indicated by a similarity function.

6. The method of claim 1, further comprising the steps of reassigning to a replacement compute device the data chunks allocated to a first compute device in the cluster and for which compute results have not been received by a predetermined deadline.

7. The method of claim 6, wherein the replacement compute device is selected from the compute devices in the plurality of compute devices which are not in the cluster, the step of reassigning to the replacement compute device further comprising sending the replacement compute device the compute model.

8. The method of claim 1, further comprising the step of:

in response to a health alert condition for a first compute device in the cluster reassigning the data chunks allocated to the first compute device and for which compute results have not been received to a replacement compute device selected from the plurality of compute devices.

9. The method of claim 8, further comprising the step of periodically requesting from each respective compute devices in the cluster a response message indicating health status of the respective compute device.

10. The method of claim 8, wherein the health alert condition for a respective compute device in the cluster comprises a lack of available resources at the compute device to complete processing of the allocated chunks with the compute model within the first predefined duration.

11. The method of claim 10, wherein the available resources comprises at least one of battery charge, available memory, processor temperature, CPU resources, and execution speed of the compute job.

12. A system for distributing data processing jobs to a plurality of compute devices in a distributed computing environment, the system comprising:

a computer platform comprising at least one programmable computer system having a computer memory storing instructions that are executable to configure the computer platform to:

the memory having computer instructions stored therein which, when executed, configure the processor to:

receive a job payload comprising a compute model and job data to be processed by the compute model;

divide the job data into a plurality of data chunks;

send the compute model and a benchmark data set extracted from the job data to a benchmark compute platform;

receive from the benchmark compute platform an indication of benchmark job computation speed for processing of the benchmark data by the compute model;

select a cluster of compute devices from the plurality of compute devices and allocate each of the plurality of data chunks to a respective compute device in the cluster such that for each respective compute device in the cluster, an estimated duration to complete processing of allocated data chunks with the compute model is less than a first predefined duration, and wherein the estimated duration is determined based on the benchmark job computation speed;

send to each respective compute device in the cluster the compute model and the data chunks allocated to the respective compute device in the cluster; and receive from respective compute devices in the cluster compute result data sets, each compute result data set associated with a respective data chunk.

13. The system of claim 12, wherein the computer platform is configured to select the cluster of compute devices and allocate the data chunks to the respective compute devices in the cluster is such that for each respective compute device in the cluster, the estimated duration to complete processing of allocated data chunks with the compute model is greater than a second predefined duration, the second predefined duration being less than the first predefined duration.

14. The system of claim 12, the computer instructions are executable to further configure the computer platform to:

identify an insufficient compute resource condition wherein a cluster of compute devices cannot be selected from available compute devices in the plurality of compute devices and data chunks to be allocated to the compute devices in the cluster so as to provide an estimated duration to complete processing of the data chunks that is less than the first predefined duration; and create in response to the insufficient compute resource condition a virtual compute device, which virtual compute device is available for inclusion in the cluster of compute devices.

15. The system of claim 12, wherein computer platform is configured send the compute model to the respective compute devices using a first data transfer process and sending the data chunks to the respective compute devices using a second data transfer process different from the first data transfer process.

16. The system of claim 12, wherein the benchmark platform comprises a plurality of benchmark devices each having a respective device type including at least a first device of a first device type and a second device of a second device type different from the first device type; the indication of benchmark job computation speed comprising a plurality of benchmark speeds, each benchmark speed associated with a respective benchmark device; and the estimated duration to complete processing of allocated data chunks by the compute model for a respective compute device in the cluster is determined based on the benchmark speed of a benchmark device in the plurality of benchmark devices that is most similar relative to remaining benchmark devices to the respective compute device in the cluster as indicated by a similarity function.

17. The system of claim 12, wherein the computer instructions are executable to further configure the computer platform to reassign to a replacement compute device the data chunks allocated to a first compute device in the cluster and for which compute results have not been received by a predetermined deadline.

18. The system of claim 17, wherein the computer instructions configure the computer platform to select the replacement compute device from the compute devices in the plurality of compute devices which are not in the cluster and send the replacement compute device the compute model.

19. The system of claim 12, wherein the computer instructions are executable to further configure the computer platform to:

in response to receipt of a health alert condition for a first compute device in the cluster, reassign the data chunks allocated to the first compute device and for which compute results have not been received to a replacement compute device selected from the plurality of compute devices.

20. The system of claim 19, wherein the computer instructions are executable to further configure the computer platform to periodically request from each respective compute device in the cluster a response message indicating health status of the respective compute device.

21. The system of claim 19, wherein the health alert condition for a respective compute device in the cluster comprises a lack of available resources at the compute device to complete processing of the allocated chunks with the compute model within the first predefined duration.

22. The system of claim 21, wherein the available resources comprises at least one of battery charge, available memory, processor temperature, CPU resources, and execution speed of the compute job.

* * * * *